(12) United States Patent
Higashi et al.

(10) Patent No.: US 7,194,091 B2
(45) Date of Patent: Mar. 20, 2007

(54) CONTENT USING SYSTEM

(75) Inventors: Akio Higashi, Takatsuki (JP); Katsumi Tokuda, Ikeda (JP); Motoji Ohmori, Hirakata (JP); Mitsuhiro Inoue, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 777 days.

(21) Appl. No.: 10/404,084

(22) Filed: Apr. 2, 2003

(65) Prior Publication Data

US 2003/0190044 A1   Oct. 9, 2003

(30) Foreign Application Priority Data

Apr. 5, 2002   (JP)   ............... 2002-103674

(51) Int. Cl.
*H04N 7/16*   (2006.01)
*H04L 9/32*   (2006.01)

(52) U.S. Cl. ................ 380/202; 713/189; 726/26
(58) Field of Classification Search ........ 380/201–202, 380/281, 284; 726/26–33; 713/189, 193; 705/57–59; 725/25, 30
See application file for complete search history.

(56) References Cited

U.S. PATENT DOCUMENTS

| | | | |
|---|---|---|---|
| 5,878,135 A | 3/1999 | Blatter et al. | |
| 5,933,500 A | 8/1999 | Blatter et al. | |
| 6,016,348 A | 1/2000 | Blatter et al. | |
| 6,983,371 B1 * | 1/2006 | Hurtado et al. | 713/189 |
| 7,035,827 B2 * | 4/2006 | Ezaki | 705/51 |
| 7,073,063 B2 * | 7/2006 | Peinado | 713/171 |
| 7,073,073 B1 * | 7/2006 | Nonaka et al. | 713/193 |
| 2001/0042043 A1 | 11/2001 | Shear et al. | |

FOREIGN PATENT DOCUMENTS

| | | |
|---|---|---|
| JP | 11-331805 | 11/1999 |
| WO | 00 04718 | 1/2000 |
| WO | 00 62505 | 10/2000 |

* cited by examiner

*Primary Examiner*—Hosuk Song
(74) *Attorney, Agent, or Firm*—Wenderoth, Lind & Ponack, L.L.P.

(57) ABSTRACT

A content using system is composed of a content importing apparatus and at least one content using apparatus. The content importing apparatus includes a content ID generating unit that generates a content ID, and a content key information encryption converting unit that converts the encryption of content key information by using an encryption key ("network key") that is shared in advance on the network. The content using apparatus includes a content key information decrypting unit that decrypts the content key information, whose encryption has been converted, by using the network key, a moved content list storing unit for storing a moved content list (MCL) in which the content IDs of contents that have been written onto a storage medium are written, and a moved content list managing unit that judges whether the writing of a content is permitted or prohibited based on the MCL.

35 Claims, 28 Drawing Sheets

FIG. 5

| CONTENT ID | NUMBER OF WRITES | WRITE DESTINATION | WRITE PATH |
|---|---|---|---|
| CONTENT-ID-11111 | 1 | - | - |
| CONTENT-ID-22222 | 2 | DVD-RAM | - |
| CONTENT-ID-88888 | 1 | - | Digital(SD) |
| CONTENT-ID-55555 | 1 | - | Analog |
| CONTENT-ID-77777 | 3 | SD CARD | - |

FIG. 13

| CONTENT ID | NUMBER OF WRITES/ MAXIMUM NUMBER OF WRITES | WRITE DESTINATION | WRITE PATH |
|---|---|---|---|
| CONTENT-ID-11111 | 1/3 | - | - |
| CONTENT-ID-22222 | 2/2 | DVD-RAM | - |
| CONTENT-ID-88888 | 1/3 | - | Digital(SD) |
| CONTENT-ID-55555 | 1/1 | - | Analog |
| CONTENT-ID-12345 | 1/3 | - | - |

FIG. 14

| CONTENT ID | NUMBER OF WRITES/ MAXIMUM NUMBER OF WRITES | WRITE DESTINATION | WRITE PATH |
|---|---|---|---|
| CONTENT-ID-11111 | 1/3 | — | — |
| CONTENT-ID-22222 | 2/2 | DVD-RAM | — |
| CONTENT-ID-88888 | 1/3 | — | Digital(SD) |
| CONTENT-ID-55555 | 1/1 | — | Analog |

FIG. 15

| | |
|---|---|
| SESSION ID | SESSION-ID-00240 |
| CONTENT USING APPARATUS ID OF TRANSMISSION SOURCE OF SYNCHRONIZATION INFORMATION | TERMINAL-ID-00001 |
| CONTENT ID | CONTENT-ID-12345 |
| NUMBER OF WRITES | 1 |
| WRITE DESTINATION | – |
| WRITE PATH | – |

SYNCHRONIZATION INFORMATION 1301

FIG. 19

| CONTENT ID | NUMBER OF WRITES | MAXIMUM NUMBER/ UNIT TIME | PENALTY PERIOD | PREVIOUS WRITE TIME |
|---|---|---|---|---|
| CONTENT-ID-11111 | 1 | 2/Day | 1hour | 22:22:22 |
| CONTENT-ID-22222 | 2 | 3/Hour | 30min | 12:05:12 |
| CONTENT-ID-88888 | 0 | 3/Day | 1hour | 11:11:11 |
| CONTENT-ID-55555 | 1 | 3/Day | 1hour | 1:02:03 |
| CONTENT-ID-77777 | 0 | 1/Day | – | – | ions # CONTENT USING SYSTEM

TECHNICAL FIELD

The present invention relates to a system for using digital contents, such as images, video and audio, that have been distributed via communication, a broadcast, etc., and in particular relates to control over the use of contents when contents are written onto an external storage medium.

BACKGROUND ART

In recent years, systems in which digital contents, such as music, video, images, and games, are distributed via the Internet or a digital broadcast and then used have reached the implementation stage.

As can be understood from the patent documents #1 to #3 listed below, in a conventional content using system, a content that has been distributed via a broadcast is bound to a network so that the content can be shared within the network and used. Here, the "binding" of a content to a network refers to a condition where only authorized terminals on the network are able to use the content. Putting this another way, if a content is bound to the network, even if a different, non-authorized terminal is connected to the network, such terminal will not be able to use the content. Additionally, if a content that has been bound to a network is moved to another network, terminals on this other network will not be able to use the content.

As one example, when a content that has been encrypted and then distributed is imported into a network (such as a home network), the content can be bound to the network by having terminals on the network use the encrypted content without conversion and by converting the encryption of the encryption key for the content. Here, "converting the encryption" refers to a process where the encryption key for the content is re-encrypted by using an encryption key (hereinafter called a "network key") that has been shared on the network in advance.

When a content that has been bound to the network is used, an appliance on the network that stores the network key can use the shared network key to decrypt the content encryption key that has been re-encrypted, and then use the decrypted content encryption key to decrypt the encrypted content.

On the other hand, an appliance that does not store the network key cannot decrypt the content encryption key and so is unable to decrypt the encrypted content.

With the content using systems described in the patent documents #1 to #3 listed below, limitations are imposed on the usage of contents as follows. Once a content has been bound to a network, the generation of copies of a content and the content encryption key on storage media, such as hard disk drives, on the network is unlimited for such data in a state where the data is bound to the network. However, the number of network appliances that may use (for example, reproduce) the content is limited.

Patent Document #1
Japanese Laid-Open Patent Application No. 11-331805
Patent Document #2
The specification of U.S. Pat. No. 5,878,135
Patent Document #3
The specification of U.S. Pat. No. 6,016,384

With the background art listed above, in reality, it is not possible to write a content outside the network with the content in a state where the content is not bound to the network. In spite of this, there are demands from users who wish to write ("move" or "export") a content that has been bound to the network to an external storage medium such as a DVD-RAM, D-VHS, an SD (Secure Digital) Card, etc., and then use the content.

In this way, there is a problem in that conventional content using systems do not consider the writing of unbound contents, and thus are unable to satisfy the user demands described above.

With such conventional systems, even if it were possible to write a content in an unbound state, there would be the risk of it being possible to make an unlimited number of copies of the content onto storage media. This leads to problems regarding copyright protection for the content.

The present invention was conceived in view of the above problems with the background art, and has an object of providing a content using system that provides, for contents that have been bound to a network, a favorable balance between the conflicting aims of satisfying the above user demands and providing copyright protection.

Putting this another way, it is an object of the present invention to provide a content using system that can provide sufficient copyright protection while satisfying the demands of users regarding the writing of contents, which have been bound to a network, onto a storage medium.

SUMMARY OF THE INVENTION

The stated object can be achieved by a content using system in which a content is used on a network to which a plurality of apparatuses are connected. The system comprises: a binding unit that is provided in at least one of the plurality of apparatuses and is operable to bind the content to the network by putting the content in a state where only the apparatuses on the network can use the content; an ID issuing unit that is provided in at least one of the plurality of apparatuses and is operable to issue a content ID that corresponds to the content that has been bound by the binding unit; a bind removing unit that is provided in at least one of the plurality of apparatuses and is operable to put the content that has been bound by the binding unit in an unbound state; a writing unit that is provided in at least one of the plurality of apparatuses and is operable to write the content that has been put in the unbound state by the bind removing unit onto a storage medium; a table unit that is provided in at least one of the plurality of apparatuses and is operable to store a table showing the content ID of the content written by the writing unit; and a suppressing unit that is provided in at least one of the plurality of apparatuses and is operable to obtain the content ID of the content to be written by the writing unit and to suppress writing of the content by the writing unit based on a content of the table.

With the above construction, each content that is bound to the network is assigned a content ID, and is managed using the writing table for contents, so that the unlimited writing of contents by the writing unit can be suppressed. That is, the writing of contents in a state where the contents are not bound to the network can be limited. As one example, it is possible to sufficiently protect the copyright of a content while satisfying the demands of individual users who wish to write a content that has been bound to a home network onto a storage medium, so that it is possible to strike a favorable balance between the conflicting aims of users regarding personal use and of the copyright holder.

The suppressing unit is operable to obtain the content ID of the content to be written by the writing unit, to add, if the obtained content ID has not been already recorded in the table, the content ID to the table without suppressing the writing of the content by the writing unit, and to suppress the writing of the content by the writing unit if the obtained content ID is present in the table.

With the above construction, if the content ID is already present in the table, the suppressing unit suppresses the writing of the content by the writing unit, so that the writing of each content by the writing unit can be permitted once and then prohibited for the second time and thereafter.

The suppressing unit is operable to obtain the content ID of the content to be written by the writing unit, to add, if the obtained content ID is not present in the table, the obtained content ID to the table and "1" as a number of writes by the writing unit, and to suppress the writing by the writing unit if the obtained content ID is present in the table and the number of writes has reached a predetermined maximum number.

With the above construction, the suppressing unit suppresses the writing by the writing unit when the content ID is present in the table and the number of writes has reached a maximum number, so that writing by the writing unit can be permitted within a range of the maximum number for each content and prohibited when the range is exceeded. One value may be set in advance as the maximum number, or the maximum number may be set for each content, so that the balance between the conflicting aims of users and the copyright holder can be set flexibly.

The binding unit is operable to bind the content to the network by encrypting a content key for decrypting the content by using a network key that is shared in advance with the plurality of apparatuses.

With the above construction, it is not necessary to re-encrypt the content itself using the network key, so that the processing load of binding a content can be reduced.

The plurality of apparatuses include one content importing apparatus and at least one content using apparatus, the content importing apparatus includes the binding unit and the ID issuing unit, and each of the content using apparatuses includes the table unit, the bind removing unit, the writing unit, and the suppressing unit.

With the above construction, the processing for the binding of a content and the generation of a content ID can be concentrated in the content importing apparatus, only one of which is present on the network.

The content using apparatuses further include: a notifying unit operable to notify, when a write has been performed by the writing unit, other content using apparatuses of at least the content ID; and an updating unit operable to update a table stored in the table unit when a notification is received from another content using apparatus.

With the above construction, the content of the table can be easily made to match in a plurality of content using apparatuses on the network.

The content using system includes one content importing apparatus and at least one content using apparatus. The content importing apparatus includes the binding unit, the ID issuing unit, the table unit and the suppressing unit. Each of the content using apparatuses includes the bind removing unit, and the writing unit.

With the above construction, the processing for the binding of a content, the generation of a content ID, the managing of the table, and the suppressing of writing can be concentrated in the content importing apparatus, only one of which is present on the network. Each content using apparatus only needs to perform writes in accordance with the suppressing unit in the content importing apparatus, so that managing the table creates no load for individual content importing apparatuses.

The content using method and content using program of the present invention have the same construction, operation and effects as those described above.

BRIEF DESCRIPTION OF THE DRAWINGS

FIG. 5 shows the composition of the moved content list according to the first embodiment.

FIG. 13 shows the composition of the moved content list of a first content using apparatus according to the second embodiment.

FIG. 14 shows the composition of the moved content list of a second content using apparatus according to the second embodiment.

FIG. 15 shows the write synchronization information according to the second embodiment.

FIG. 19 shows the composition of the moved content list according to the third embodiment.

DETAILED DESCRIPTION OF THE INVENTION

First Embodiment

The following describes a first embodiment of the present invention in detail with reference to the attached drawings.

Figure 1:
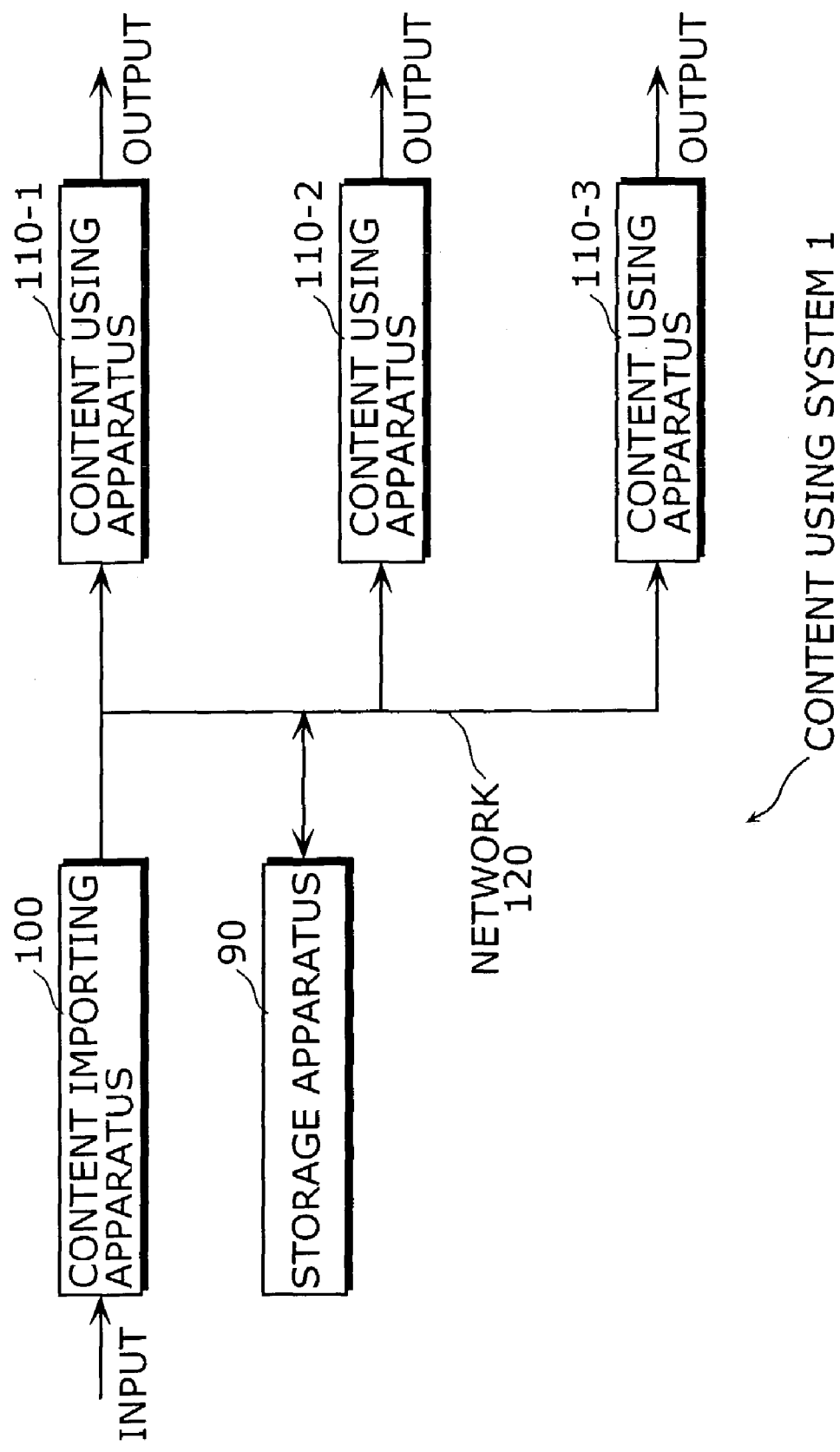
FIG. 1 shows the overall construction of a content using system according to the embodiments of the present invention.

FIG. 1 shows the overall construction of a content using system 1 according to the first embodiment of the present invention.

In this content using system, contents that are distributed via a digital broadcast are used by appliances that are connected to a network. This content using system 1 is composed of a content importing apparatus 100 that imports contents, a storage apparatus 90, a plurality of content using apparatuses 110-1, 110-2, 110-3, etc., that use contents, and a network 120 that connects these appliances.

The content importing apparatus 100 imports a content from a broadcast wave and binds the content to the network 120 by decrypting encrypted content key information that includes at least an encryption key for the content (hereinafter called the "content key"), and re-encrypting the content key information by using an encryption key (hereinafter called the "network key") that has been shared in advance on the network 120. This is to say, the content importing apparatus 100 "converts the encryption of" the content key information.

Figure 2:
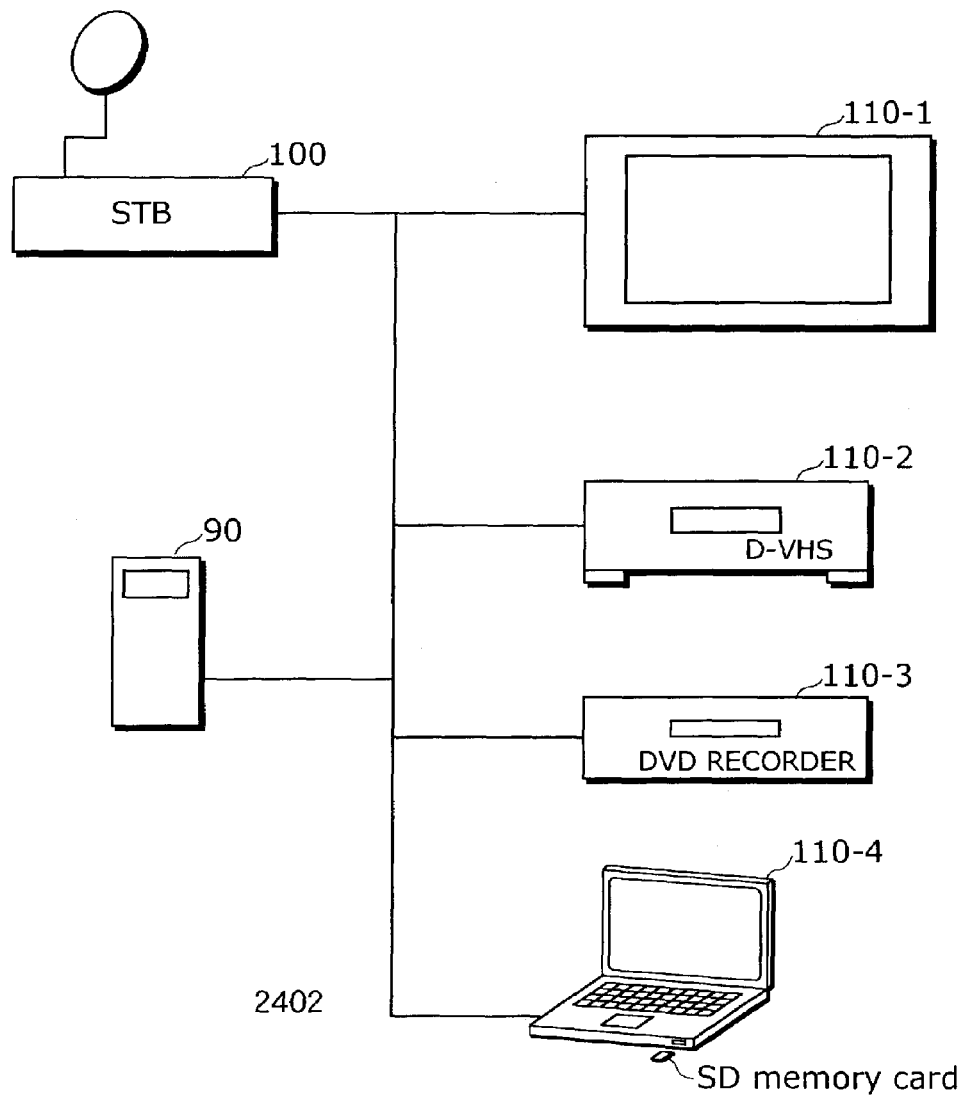
FIG. 2 shows the overall construction of a content using system according to the embodiments of the present invention.

As one example, as shown in FIG. 2, the content importing apparatus 100 is an STB (Set Top Box) for receiving digital broadcasts, and performs a process that (i) receives a content subject to access control according to CAS (Conditional Access System) and an encrypted ECM (Entitlement Control Message) that includes the content key as access key information, (ii) reconstructs the ECM section, (iii) decrypts the encrypted ECM, (iv) re-encrypts the ECM by using the network key, and (v) outputs the content and the re-encrypted ECM to the network 120. It should be noted that, ECM is realized using a "private" section defined according to the MPEG-2 Systems, and has a construction similar to that shown in FIG. 4. It should be noted that MPEG-2 Systems is defined according to the international standard ISO/IEC 13818-1.

Figure 4:
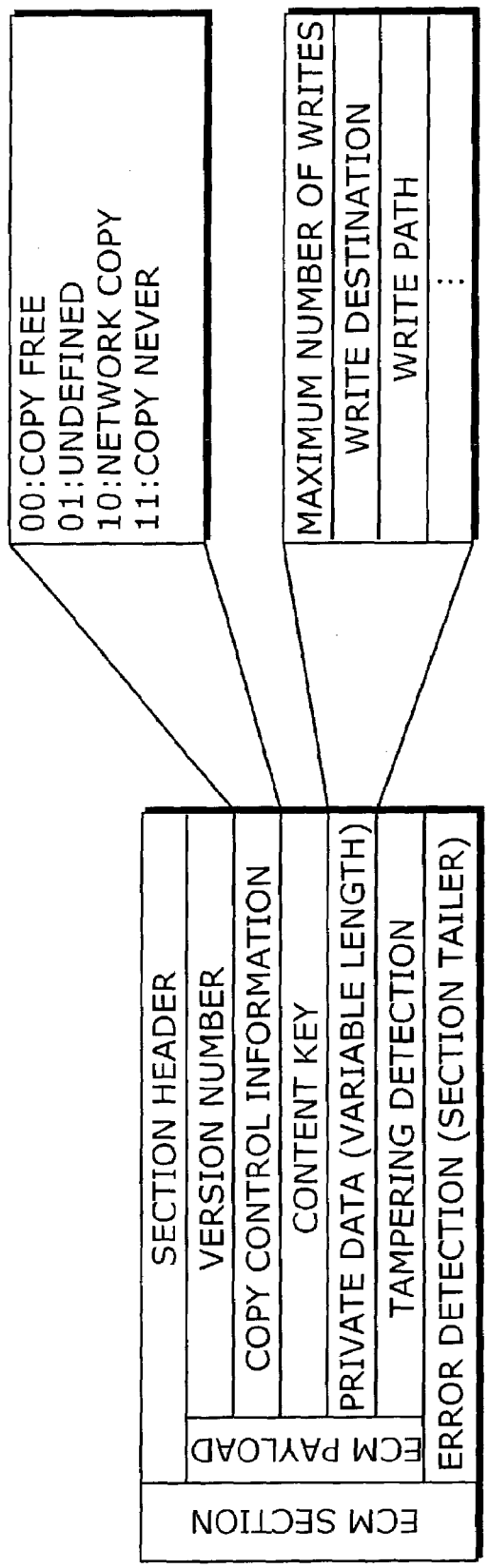
FIG. 4 shows the composition of the ECM section and the ECM according to the first embodiment.

The ECM section shown in FIG. 4 is constructed so as to include a section header, an ECM payload, and a section tailer_(for error correction). As one example of the content of the ECM payload, the ECM section shown in FIG. 4 has a version number, copy control information, a content key, variable-length private data, and tampering detection data. The version number shows the ECM version. The copy control information shows whether or not copying is permitted ("COPY FREE", "NETWORK COPY", "COPY NEVER" etc.) for the content. The content key is also called the scrambling key, and is used for encrypting and decrypting the content. The private data includes any freely-chosen data that is of a variable length. The tampering detection data is set for detecting any tampering with the ECM. It should be noted that the encrypted part of the ECM is the entire ECM payload, which is encrypted by using a work key or the like that is distributed via an EMM (Entitlement Management Message).

The copy control information described above is set by the copyright holder or the content provider/service provider, etc. Here, "COPY NEVER" means that copying is not permitted and that the content can only be reproduced, with the content not being bound to the network. "NETWORK COPY" means that copies can be freely made only within a private network, with the content being bound to the network. "COPY FREE" means that copies can be freely made, with it being possible to bind the content to the network, although this is not necessary.

In the present embodiment, the content provider/service provider can set the maximum number of writes (copies), the write(output) destination, and the write (output) path, etc., in the private data described above. Such information is used as conditions for controlling the writing and reproduction/displaying of contents that have been bound to the network.

The storage apparatus 90 stores the content that has been imported by the content importing apparatus 100 and the content key information whose encryption has been converted. That is, the storage apparatus 90 stores the content in a state where the content is bound to the network.

As one example, the storage apparatus 90 is the home server shown in FIG. 2, includes a hard disk drive, and can be accessed by appliances on the network.

The content using apparatuses 110-1, 110-2, 110-3, etc., obtain the content and the content key information whose encryption has been converted from the content importing apparatus 100 or the storage apparatus 90, decrypt the encrypted content key by using the network key that has already been obtained to extract the content key, decrypt the content by using the content key, and then use the content. Also, in the present content using system 1, the plurality of content using apparatuses 110-1, 110-2, 110-3, etc., can connect to the network 120.

As one example, as shown in FIG. 2, the content using apparatuses 110-1, 110-2, 110-3, etc., may be appliances such as a digital TV 110-1, a D-VHS 110-2, a DVD recorder 110-3, and a PC 110-4, etc., that display a content and store the content onto a removable medium such as a D-VHS tape, a DVD-RAM, and an SD memory card. Alternatively, the content using apparatuses 110 may be appliances that combine any of these functions.

The network 120 is a network that connects the content importing apparatus 100 and the content using apparatuses 110-1, 110-2, 110-3, etc. to one another, and is realized, for example, by an IEEE 1394 bus, IEEE 802.3 (10/100 Base-T), or Bluetooth.

Figure 3:
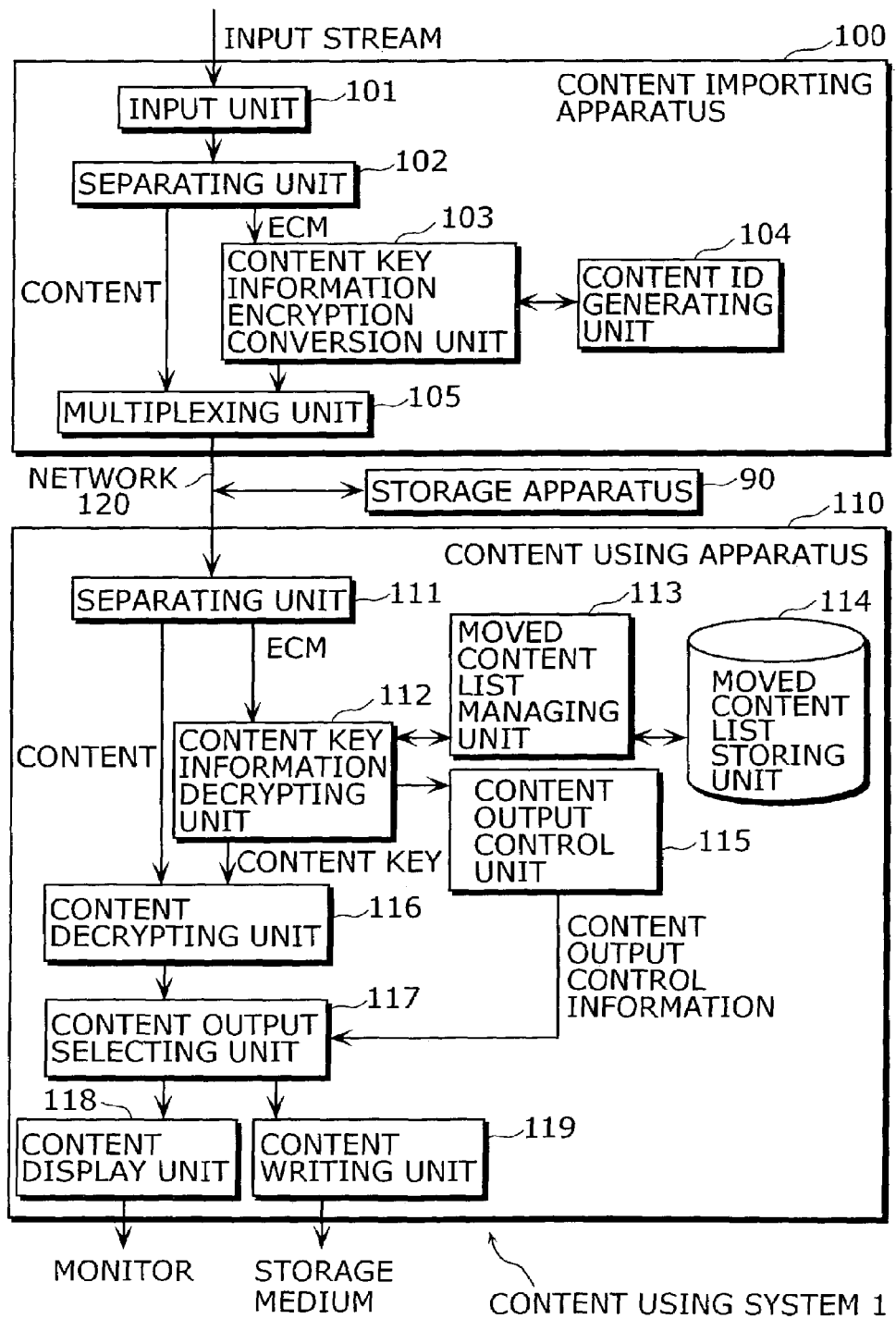
FIG. 3 is a functional block diagram showing the constructions of a content importing apparatus and a content using apparatus according to the first embodiment.

FIG. 3 is a functional block diagram showing the constructions of the content importing apparatus 100 and a content using apparatus 110 shown in FIG. 1. This content using system 1 is constructed so that contents that have been bound to the network can be identified individually, and limitations are imposed on the writing of contents in a state where the contents are not bound to the network. It should be noted that in FIG. 3, the single content using apparatus 110 is used to represent the content using apparatuses 110-1, 110-2, 110-3, etc., that have the same construction. The storage apparatus 90 and the network 120 are also shown in FIG. 3.

The content importing apparatus 100 includes an input unit 101, a separating unit 102, a content key information encryption conversion unit 103, a content ID generating unit 104, and a multiplexing unit 105.

The input unit 101 imports an MPEG-2 transport stream ("TS") of a digital broadcast as an input stream. The transport stream is constructed by packet-multiplexing a content, an ECM, an EMM, PSI (Program Specific Information), etc. and can be identified by the PIDs (Packet IDs) of the header parts of the transport stream packets (TS packets).

The separating unit 102 separates the transport stream imported by the input unit 101 into the content, the ECM, etc.

More specifically, the separating unit 102 refers to PSI called a PMT (Program Map Table) and obtains the elementary PIDs that compose the stream. After this, the separating unit 102 executes a process that refers to the PIDs in the header parts of the TS packets, and separates the packets of the content and the ECM, etc.

The content key information encryption conversion unit 103 reconstructs the ECM section from the ECM packets received from the separating unit 102, extracts the ECM, and converts the encryption of the ECM. That is, the content key information encryption conversion unit 103 decrypts the encrypted ECM and uses the network key described above to re-encrypt the decrypted ECM.

More specifically, the ECM is distributed in a state where the ECM has been encrypted by using the work key of the CAS and then multiplexed in the broadcast wave. The content key information encryption conversion unit 103 decrypts the encrypted ECM by using the work key of the CAS, requests the content ID generating unit 104 to issue a content ID, inserts the content ID, which has been generated by the content ID generating unit 104 in accordance with this request, into the decrypted ECM, and then re-encrypts the ECM by using the network key. It should be noted that the work key is usually distributed via an EMM that is multiplexed into the broadcast wave before the distribution of a content, so that the content key information encryption conversion unit 103 can obtain the work key in advance.

In this way, by inserting the content ID into an ECM that includes the content key which is the encryption key for a content, the content and the content ID can be securely bound. Here, the units for the assigning of content IDs may be events that are identified by the separating unit 102. Here, an "event" is a content that corresponds to one broadcast program. In this case, the content key information encryption conversion unit 103 identifies an event by obtaining event information such as an event_id from an EIT (Event Information Table) in the SI (Service Information) in a TS, and requests the generation of content IDs in such event units.

Based on the request from the content key information encryption conversion unit 103, the content ID generating unit 104 issues a unique content ID. More specifically, the content ID generating unit 104 has an internal counter and upon receiving a request for the issuing of a content ID from the content key information encryption conversion unit 103, performs a process that assigns the present counter value as a content ID and increments the counter.

The multiplexing unit 105 performs a process that multiplexes the content received from the separating unit 102 and the encrypted ECM received from the content key information encryption conversion unit 103 to reconstruct a transport stream.

The storage apparatus 90 stores the transport stream outputted from the multiplexing unit 105.

On the other hand, the content using apparatus 110 includes a separating unit 111, a content key information decrypting unit 112, a moved content list managing unit 113, a moved content list storing unit 114, a content output control unit 115, a content decrypting unit 116, a content output selecting unit 117, and a content display unit 118 and a content writing unit 119 as content outputting units.

The separating unit 111 operates as follows. When a content display request or a content writing request has been received in the content using apparatus 110 from the user, the separating unit 111 separates the content and the re-encrypted ECM from a transport stream obtained from the content importing apparatus 100 or the storage apparatus 90.

The content key information decrypting unit 112 receives the re-encrypted ECM from the separating unit 111 and decrypts the re-encrypted ECM by using the network key. When doing so, if the user has made a content writing request, the content key information decrypting unit 112 transfers the decrypted content key to the content decrypting unit 116 only when it has been judged by the moved content list managing unit 113 that the write is permitted. More specifically, the content key information decrypting unit 112 decrypts the re-encrypted ECM by using the network key and transfers the content ID included in the ECM to the moved content list managing unit 113. The content key information decrypting unit 112 then receives a judgment result from the moved content list managing unit 113 showing whether the writing of the content with that content ID is permitted or prohibited, and when the judgment result is "permitted", transfers the decrypted content key to the content decrypting unit 116. In this way, the moved content list managing unit 113 judges whether writing is permitted or prohibited for individual contents, so that it is not possible to unlimitedly output contents in an unbound state to the outside.

When a content display request has been received from the user, the processing of the content key information decrypting unit 112 is the same as when a content writing request has been received. However, the judgment result received from the moved content list managing unit 113 is a judgment result regarding the reproduction/display of the content and not a judgment result regarding whether writing is permitted or prohibited.

The moved, content list managing unit 113 performs a judgment as to whether the outputting of a content is permitted or prohibited based on a moved content list (hereinafter "MCL") that is stored in the moved content list storing unit 114, and updates the MCL. Here, the MCL is a list that includes at least the content IDs of contents that have already been written. The judgments as to whether or not the outputting of contents is permitted include judgments as to whether or not the writing of a content is permitted and judgments as to whether or not the reproduction/display of a content is permitted.

More specifically, when a content ID has been received from the data I/O control circuit 12, the moved content list managing unit 113 judges whether or not the writing of a content is permitted according to processes such as (A) and (B) below.

(A) The moved content list managing unit 113 judges whether or not the received content ID is already registered in the MCL, and when the content ID has not been registered, adds the content ID to the MCL and permits the writing. When the content has already been registered, the moved content list managing unit 113 prohibits the writing. In this case, it is possible to permit the writing of the content only once, with the second and subsequent writings of the content being prohibited. In this case, the MCL is a content ID list of contents that have already been written once. The non-registration of a content ID in the MCL is the condition (writing condition) for writing a content.

(B) The moved content list managing unit 113 judges that the received content ID has already been registered in the MCL. When the content ID has not been registered, the moved content list managing unit 113 registers the content ID in the MCL, and judges whether the writing of the content is permitted or prohibited in accordance with a predetermined writing condition or the MCL. When the content ID has been registered, the moved content list managing unit 113 judges whether the writing of the content is permitted or prohibited in accordance with the writing condition corresponding to the content ID. Here, the writing conditions may be a permitted number of writes for a content, a write destination (the kind of storage medium for the write), a writing path (analog output/digital output, etc.) and the like. In this case, the writing of each content is limited in accordance with the writing conditions for each content. The number of permitted writes for a content may be the number of content using apparatuses 110 that share the network key in the network 120, for example.

The moved content list managing unit 113 judges whether the reproduction/display of a content is permitted or prohibited in the same way as the processes (A) and (B) above, although such judgments are made according to content reproduction/display conditions, not content writing conditions.

The moved content list managing unit 113 also securely manages a hash value of the MCL stored in the moved content list storing unit 114. This is used to detect whether or not the MCL has been tampered with and thus ensures the authenticity of the MCL in a case where the MCL is stored in a non-secure region of a hard disk drive or the like. Accordingly, whenever the content of the MCL is updated, the moved content list managing unit 113 calculates the hash value for the MCL and manages the calculation result. As one example of a method for securely managing the hash value, the hash value may be stored inside a security module, which is tamper-resistant hardware.

In addition, the moved content list managing unit 113 manages the maximum size of the MCL and/or a threshold relating to the number of content IDs or the size of the MCL. Here, in a case where a threshold for the maximum number of content IDs or a maximum number of bytes that can be written in the MCL is provided and this threshold for the MCL is reached, control is performed to delete the information for the oldest content IDs in the MCL. More specifically, the moved content list managing unit 113 manages a pointer that shows the next writing position for the MCL, and when an upper limit for the MCL is reached, the pointer is returned to the start of the MCL, so that it is possible to delete information starting from the oldest content ID.

Alternatively, by writing the time and date when a content was accessed as the information for each content in the MCL, deletion (overwriting) can be performed starting from the information with the lowest access frequency.

Alternatively, instead of automatically deleting information as described above, the information to be deleted from the MCL may be selected by the user and then deleted by a user operation.

The moved content list storing unit 114 stores the MCL and is realized by a hard disk drive or the like.

The content output control unit 115 outputs content output control information for controlling the outputting of a content to the content output selecting unit 117. More specifically, based on a content display request or a content write request from the user, the content output control unit 115 generates content output control information indicating an outputting of the content to the content display unit 118 or an outputting of the content to the content writing unit 119, and transmits the content output control information to the content output selecting unit 117.

The content decrypting unit 116 decrypts the encrypted content. More specifically, the content decrypting unit 116 performs a process that uses the content key obtained from the content key information decrypting unit 112 to successively decrypt TS packets of the content that have been encrypted by using the content key.

The content output selecting unit 117 controls the transfer destination of the content based on the content output control information obtained from the content output control unit 115. More specifically, the content output selecting unit 117 performs a process that transmits, when the content output control information shows "display", the content to the content display unit 118, and transmits, when the content output control information shows a write to a storage medium, the content to the content writing unit 119.

The content display unit 118 reconstructs an MPEG-2 elementary stream from the TS packets of the content, decodes the MPEG-2 elementary stream, and outputs the content to a monitor.

The content writing unit 119 performs the processing required to write the content and a process that writes the content onto a storage medium. More specifically, the content writing unit 119 performs a process that converts the encryption of the content to bind the content to the medium and converts the format, etc.

FIG. 5 shows one example of the data construction of the MCL that is stored by the moved content list storing unit 114 and is managed by the moved content list managing unit 113. This MCL is a list in which contents that have been written by the content writing unit 119 and contents subjected to reproduction/display by the content display unit 118 are written. As shown in the FIG. 5, the MCL includes a number of writes, write destinations, and a write path corresponding to each content ID. The number of writes shows the number of times that writing on a storage medium has been performed for each content by the content writing unit 119. The write destination shows the storage medium, such as a DVD-RAM, D-VHS, and an SD card, for which writing is permitted. The write path shows the output state, such as analog output, digital output (compressed/uncompressed), and output image quality (SD(Standard Definition)/HD (High Definition)). The moved content list managing unit 113 may obtain information such as the write destinations and write paths from the private data in the ECM shown in FIG. 4 and set the information in the MCL, or may obtain such information from information (such as the content, ECM, and PSI/SI) included in a broadcast wave and set the obtained information in the MCL, or may even set values that are stored in advance in the present content using system.

From an MCL with the above construction, it is possible to know the number of times that a content has already been written, so that the moved content list managing unit 113 can limit the writing of a content within a range stipulated by a maximum number of writes for each single content.

The operation of the content using system 1 with the construction described above is explained below using the flowcharts shown in FIGS. 6 and 7.

Figure 6:
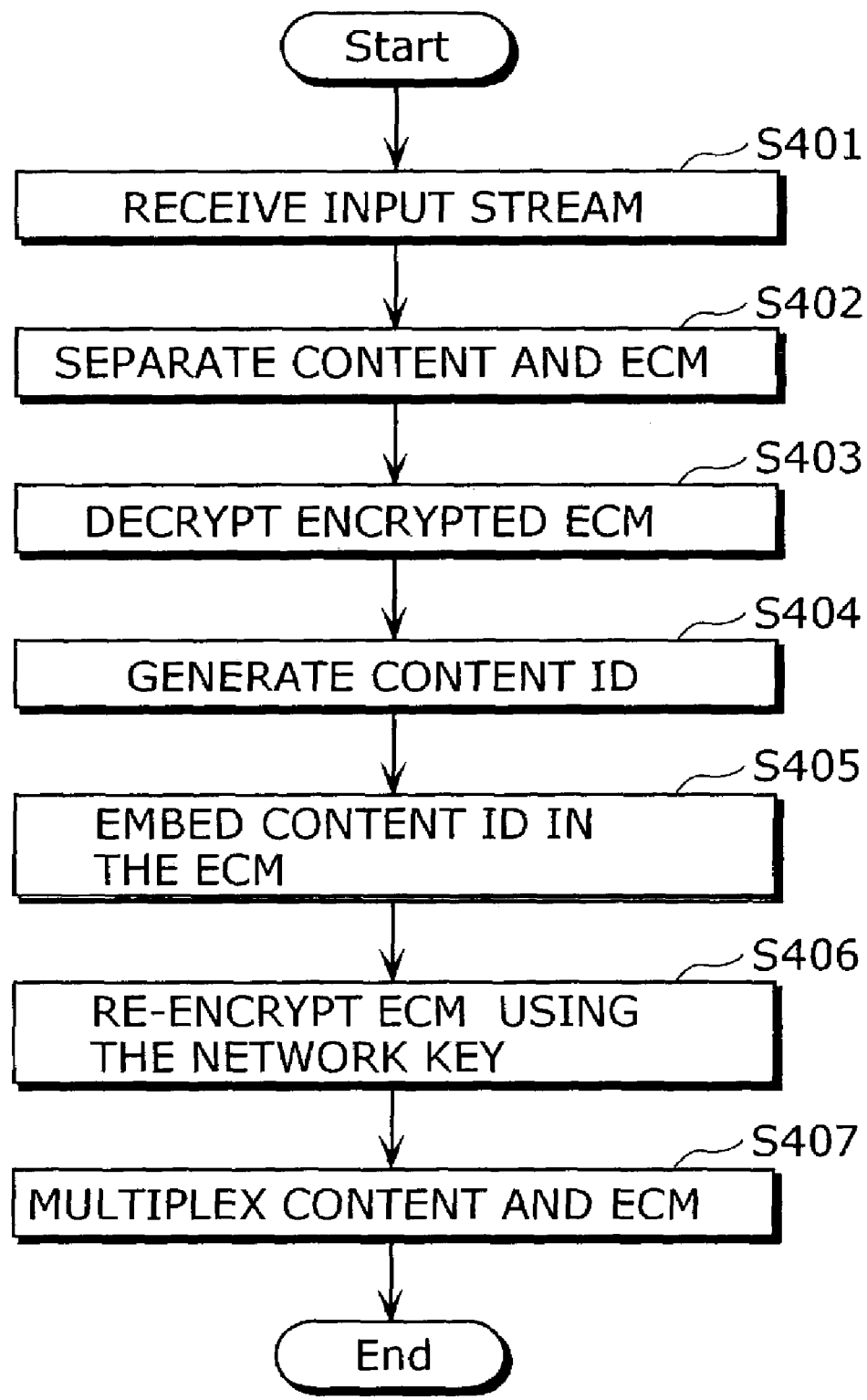
FIG. 6 is a flowchart showing the content importing process of the content importing apparatus according to the first embodiment.

FIG. 6 is a flowchart showing the content importing process of the content importing apparatus 100.

The input unit 101 receives a transport stream from a broadcast wave (step S401).

The separating unit 102 obtains the transport stream from the input unit 101, refers to the PIDs of the TS packets, and separates the TS packets of a content and the TS packets of an ECM and the like (step S402). The PIDs showing the TS packets of the content and the ECM are written in the PMT, so that by referring to the PMT, the separating unit 102 separates these TS packets.

The content key information encryption conversion unit 103 obtains the TS packets of the ECM, reconstructs the ECM section, and decrypts the encrypted ECM by using the work key (step S403). In addition, when the copy control information of the decrypted ECM is "COPY NEVER", the content key information encryption conversion unit 103 does not bind the content to the network and thus does not perform the processing described below (although reproduction/display of the content is permitted). When the copy control information is "NETWORK COPY", the content key information encryption conversion unit 103 performs the processing described below. When the copy control information is "COPY FREE", it may not be necessary to bind the content to the network, although the content key information encryption conversion unit 103 may bind the content to the network with the number of writes set at "unlimited".

The content key information encryption conversion unit 103 sends a content ID generation request to the content ID generating unit 104. The content ID generating unit 104 receives this request and generates a content ID (step S404).

The content ID generating unit 104 sends the generated content ID to the content key information encryption conversion unit 103. The content key information encryption conversion unit 103 embeds the obtained content ID in the ECM (step S405). More specifically, the content ID generating unit 104 generates a content ID by using the counter that is stored internally, and transmits this content ID to the content key information encryption conversion unit 103. The content key information encryption conversion unit 103 sets the received content ID in a specified field in the ECM. As one example, a method where the content ID is inserted into the private data part of the ECM shown in FIG. 4 may be used.

The content key information encryption conversion unit 103 re-encrypts the ECM by using the network key (step S406). More specifically, the content key information encryption conversion unit 103 internally stores an encryption key that has been shared in advance on the network, and uses this encryption key to re-encrypt the ECM in which the content ID has been embedded. In addition, the content key information encryption conversion unit 103 converts the encrypted ECM into TS packets and transfers these TS packets to the multiplexing unit 105.

The multiplexing unit 105 multiplexes the TS packets of the content received from the separating unit 102 and the TS packets of the ECM, whose encryption has been converted, received from the content key information encryption conversion unit 103 (step S407).

After multiplexing, the content and ECM are stored in the storage apparatus 90. Alternatively, the content and ECM are inputted into the content using apparatus 110 at the same time that the content and ECM are stored in the storage apparatus 90.

In this way, in the content importing apparatus 100, the encryption of the ECM is converted, thereby generating a content that has been bound to the network, and a content ID is set in the ECM which is multiplexed with the content.

Figure 7:
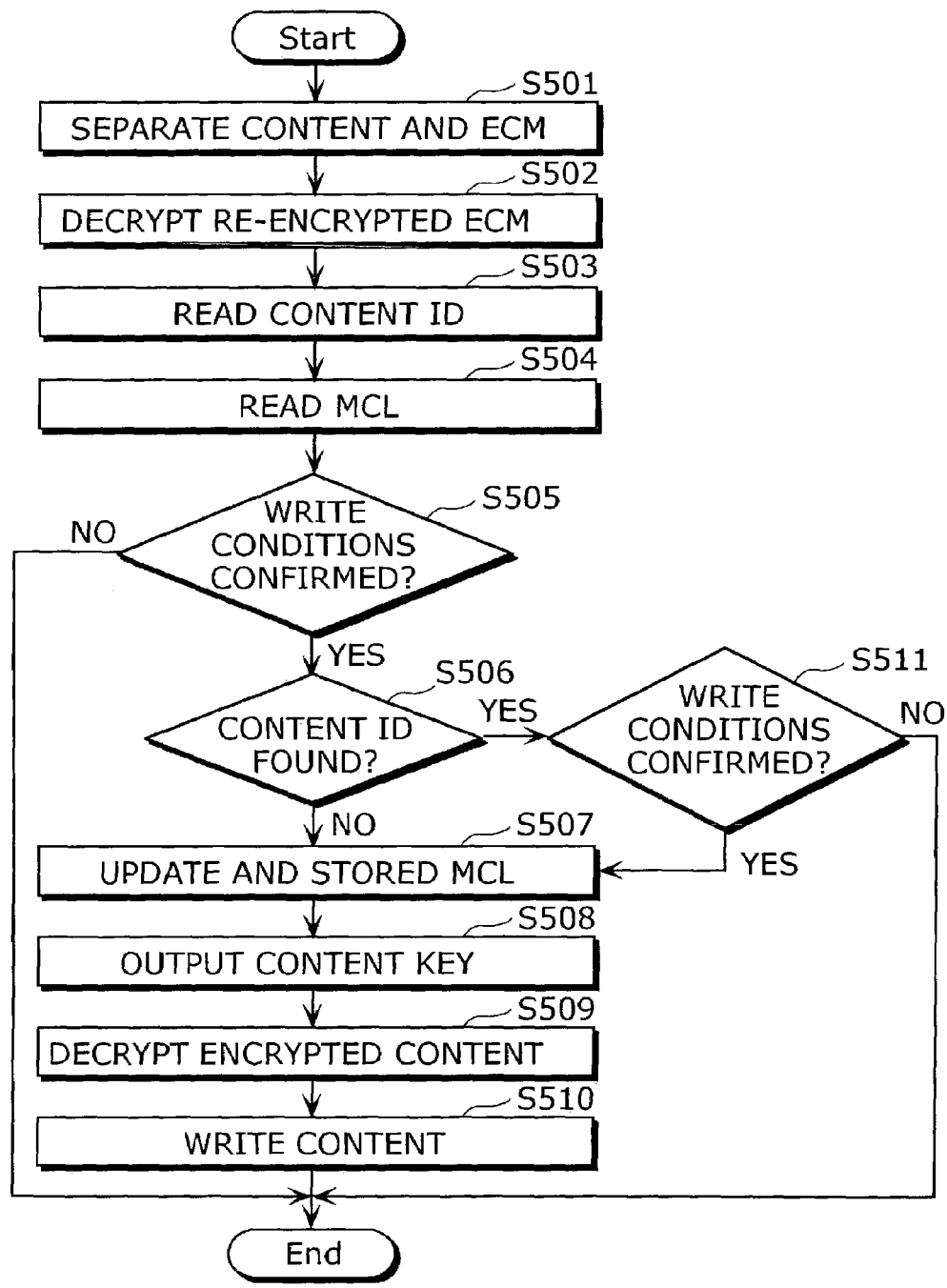
FIG. 7 is a flowchart showing the content writing process of the content using apparatus according to the first embodiment.

On the other hand, FIG. 7 is a flowchart showing the content writing process of the content using apparatus 110.

In the separating unit 111, the content and the ECM are separated from either a transport stream received from the content importing apparatus 100 or a transport stream that has been read from the storage apparatus 90 (step S501). More specifically, the separating unit 111 performs a process that refers to the PIDs that are in the header parts of the TS packets in the transport stream, and separates the TS packets corresponding to the respective PIDs.

The content key information decrypting unit 112 receives the TS packets of the ECM from the separating unit 111, reconstructs the ECM section, and obtains the re-encrypted ECM. The content key information decrypting unit 112 then decrypts the encrypted part of the ECM by using the network key that is obtained in advance (step S502).

The content key information decrypting unit 112 reads the content ID that has been embedded in the decrypted ECM (step S503). In order to confirm whether or not writing is permitted for the present content, the content key information decrypting unit 112 transfers the read content ID to the moved content list managing unit 113.

The moved content list managing unit 113 reads the MCL from the moved content list storing unit 114 (step S504). The moved content list managing unit 113 first obtains conditions such as the write destination and the write path of the content from information (such as the content, the ECM and the PSI/SI) included in the transport stream or from parameters that are set in advance in the system, and then confirms whether or not the write destination and the write path indicated by the user satisfy the conditions (step S505). As one example, when the user indicates "D-VHS" as the write destination, and a write destination that is provided in advance in the content using apparatus 110 is "D-VHS", the content can be written to D-VHS, but when the write destination that is provided in advance in the content using apparatus 110 is "SD card", such writing to D-VHS is not possible. This is also the case for the write path, so that unless the write path indicated by the user satisfies the write path provided in advance in the content using apparatus 110, the content cannot be written onto a storage medium.

In addition, the moved content list managing unit 113 judges whether or not the content ID received from the content key information decrypting unit 112 is present in the MCL (step S506). It should be noted that when there is no MCL in the moved content list storing unit 114 (a pre-initialization state), an MCL is generated (initialization is performed).

When the judgment in step S506 is "NO", which is to say, when a content ID is not present in the MCL, the moved content list managing unit 113 performs a process that updates the MCL and stores the MCL in the moved content list storing unit 114 (step S507). In this case, it is judged that writing is permitted for the present content.

In order to record the writing of the content, the moved content list managing unit 113 adds the content ID, the number of writes, the write destination, and the write path to the MCL, recalculates the hash of the MCL, and stores the MCL in the moved content list storing unit 114, in addition to replacing the hash value stored in the moved content list managing unit 113 with the recalculated hash value for the MCL.

The content key information decrypting unit 112 extracts the content key from the ECM and transfers the content key to the content decrypting unit 116, and also instructs the content output control unit 115 to transfer the content to the content writing unit 119 via the confirmed write destination and write path (step S508). Accordingly, the content output control unit 115 controls the content output selecting unit 117 to write the content on the indicated write destination and write path.

The content decrypting unit 116 decrypts (descrambles) the TS packets obtained from the separating unit 111 by using the content key obtained from the content key information decrypting unit 112 (step S509).

The content output selecting unit 117 transfers, according to control by the content output control unit 115, the content to the content writing unit 119 by using the indicated write destination and write path.

The content writing unit 119 writes the content onto a storage medium (step S510). More specifically, the content writing unit 119 encrypts the content in a suitable manner, changes the format, etc., in accordance with the storage medium, such as a DVD-RAM or D-VHS, and then writes the content onto the storage medium.

When the judgment in step S506 is "YES", which is to say, when the content ID is present in the MCL, the moved content list managing unit 113 judges whether writing is permitted or prohibited by using the information in the MCL that is related to this content ID (step S511). More specifically, since a number of writes, a write destination, a write path, etc., are recorded in the MCL for each content ID, the moved content list managing unit 113 refers to this information and confirms whether or not writing is permitted.

As one example, when the permitted number of writes for each content is "3", if the content ID of the content to be written is "CONTENT-ID-11111" in FIG. 5, the number of writes is "1", meaning that two more writes are possible, so that the moved content list managing unit 113 judges that the write is possible. When doing so, the content of the MCL relating to the write destination and the write path is "-", which is to say, that there are no limitations over the write destination and the write path, so that writing can be performed for the write destination and the write path indicated by the user. When the content ID is "CONTENT-ID-22222" and the write destination indicated by the user is "DVD-RAM", in the MCL the number of writes is "2" and the write destination is "DVD-RAM", so that the moved content list managing unit 113 judges that the write is permitted. If, at this point, the write destination indicated by the user is "SD CARD" for example, even though the maximum number of writes has not been reached, the limitation over the write destination is not satisfied, so the moved content list managing unit 113 judges that the write is not permitted. In the same way, when the content ID is "CONTENT-ID-88888" and the write path indicated by the user is "Digital (SD)", the limitations on the number of writes and the write path are both satisfied, so that the moved content list managing unit 113 judges that the write is permitted, but when the write path indicated by the user is "Digital (HD)", the limitation on the write path is not satisfied, so that the moved content list managing unit 113 judges that the write is not permitted. In addition, when the content ID is "CONTENT-ID-77777", the number of writes has already reached "3", so that the moved content list managing unit 113 judges that the write is not permitted.

When the judgment in step S511 is "YES", which is to say, the moved content list managing unit 113 has judged that the write is permitted, the moved content list managing unit 113 updates and stores the MCL (step S507). The detailed processing from step S507 onwards is as was described above, so a repeated description of such has been omitted.

When the judgment in step S511 is "NO", which is to say, the moved content list managing unit 113 has judged that the write is prohibited, the content writing process is terminated.

In this way, in the content using system 1, when a content ID is assigned to a content that has been bound to the network and the content is written, the writing is confirmed by using the MCL so that it is possible to impose limitations on the writing of contents.

Figure 8:
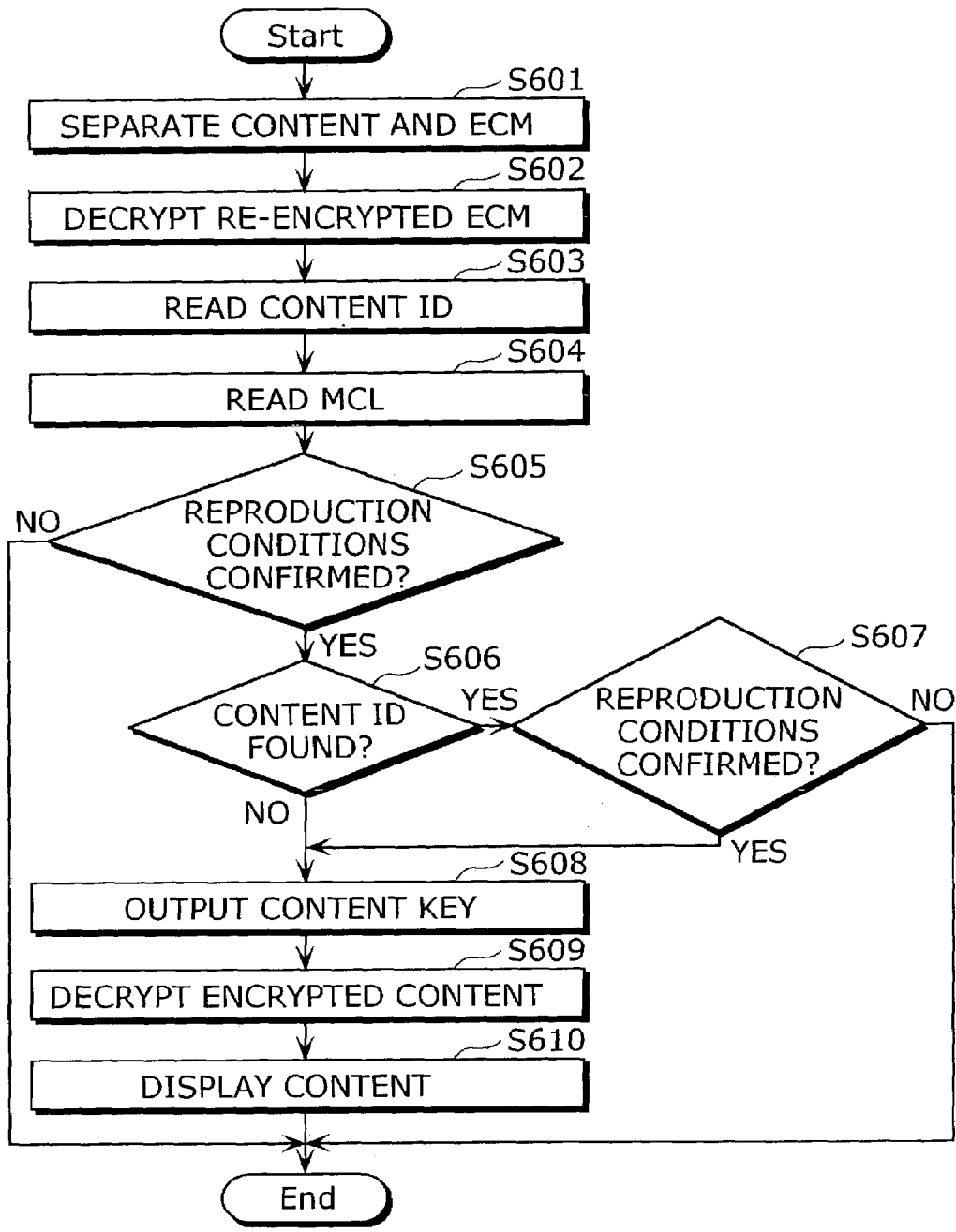
FIG. 8 is a flowchart showing the content reproducing process of the content using apparatus according to the first embodiment.

Also, while FIG. 7 is a flowchart showing the content writing process in the content by using apparatus 110, FIG. 8 is a flowchart showing the content reproduction (display) process.

In FIG. 8, the processing in steps S601 to S606 are the same as in the content writing process shown in FIG. 7, so a repeated description of such has been omitted.

When the judgment of the moved content list managing unit 113 in step S606 is "NO", which is to say, when the present content ID is not present in the MCL, the present content has not been written, so that the moved content list managing unit 113 judges that the reproduction process is permitted, and the content key information decrypting unit 112 performs a process that extracts the content key from the ECM and transfers the content key to the content decrypting unit 116 (step S608).

The content decrypting unit 116 decrypts (descrambles) the TS packets obtained from the separating unit 111 by using the content key obtained from the content key information decrypting unit 112 (step S609).

The content output selecting unit 117 transfers the content to the content display unit 118 for displaying the content, based on control by the content output control unit 115.

The content display unit 118 outputs the content to a TV set or the like (step S610).

When the judgment of the moved content list managing unit 113 in step S606 is "YES", which is to say, the present content ID is present in the MCL, the moved content list managing unit 113 confirms whether reproduction is permitted or prohibited by using the information in the MCL relating to the present content ID (step S607). More specifically, the moved content list managing unit 113 confirms whether or not the number of writes has reached the maximum number of writes, and judges that reproduction is permitted when the maximum number of writes has not been reached and that reproduction is prohibited when the maximum number of writes has been reached.

When the judgment in step S607 is "YES", which is to say, when reproduction is permitted, the processing in steps S608 onwards is executed.

When the judgment in step S607 is "NO", which is to say, when reproduction is prohibited, the content reproduction process is terminated.

In this way, in the present content using system 1, even for a content that has been written on a storage medium, there is the possibility that a copy of the content is present on the network, so that during the display (reproduction) process for a written content, the MCL is also used to confirm whether or not reproduction of the content is permitted, thereby imposing limitations on the usage of the content.

However, there can be cases where the writing process is interrupted (fails) due to the power being cut off or the user canceling the process, for example. For this reason, the present content using system 1 is designed so as to be able to resume the writing process. More specifically, in FIG. 3, the content key information decrypting unit 112 assigns IDs (hereinafter referred to as "scramble IDs") in scramble units (for example, the units in which the content key included in the ECM is updated), with the content decrypting unit 116 receiving the content key and this scramble ID and storing up to what point the content has been transferred to the content writing unit 119, which is to say, up to what point the writing of the content onto a storage medium has succeeded. When the process is cancelled and the writing process is thereafter resumed, the content decrypting unit 116 transfers the stored scramble ID to the content key information decrypting unit 112 so that the processing can be resumed from the scramble ID.

This process is described below using the flowcharts shown in FIGS. 9 and 10.

Figure 9:
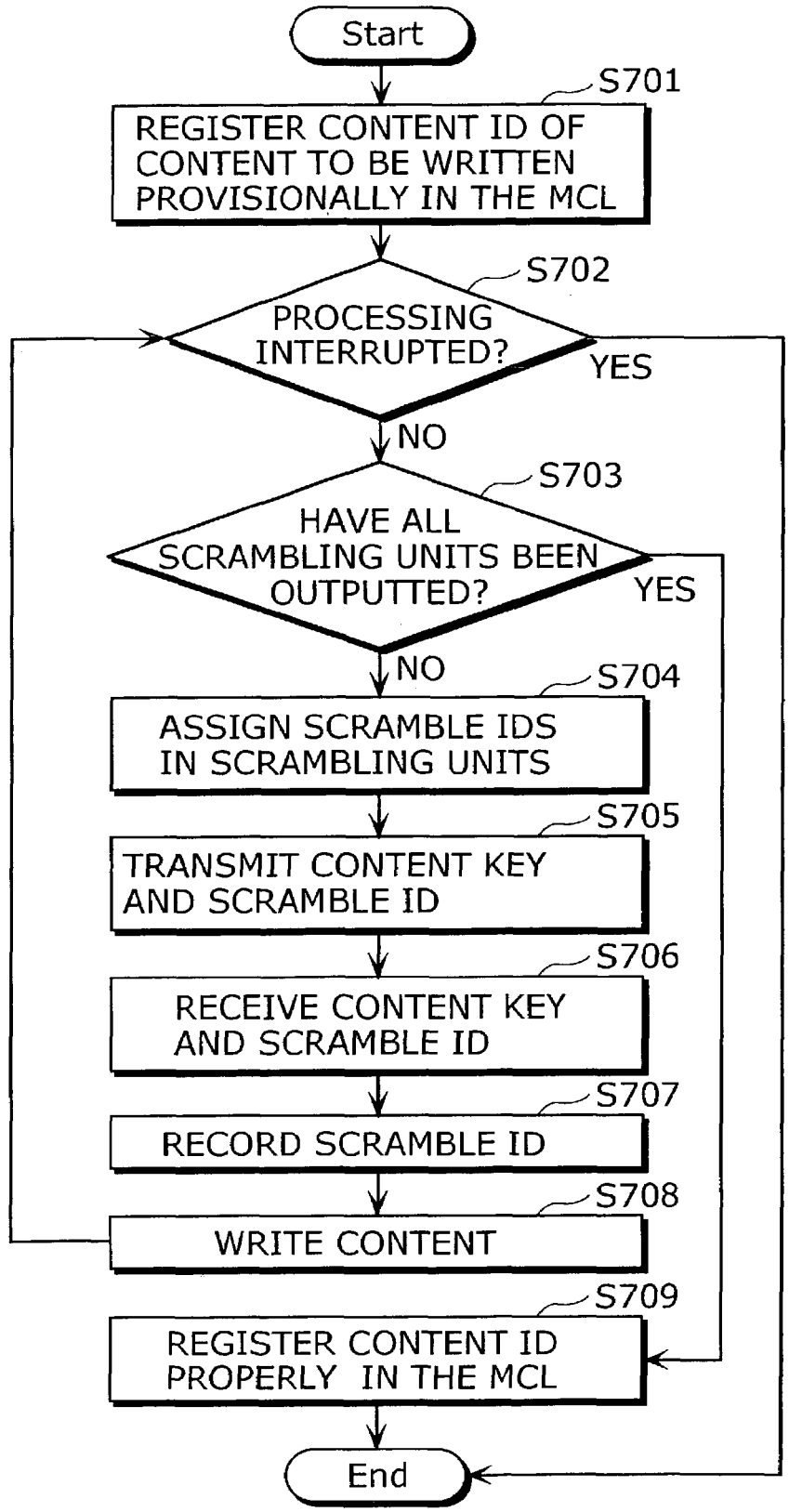
FIG. 9 is a flowchart showing the generation of scramble IDs and the recording process in the content writing process of the content using apparatus according to the first embodiment.

FIG. 9 is a flowchart showing the process for writing a content onto a storage medium. FIG. 9 shows the processing from the start of a write up to an interruption (a "cancel" or a "pause") and then up to the end of a write.

Once the writing process for a content is commenced, the moved content list managing unit 113 provisionally registers the content ID of the content being written (step S701).

The content key information decrypting unit 112 checks whether or not a writing process interruption (cancel) cause has occurred (step S702). When the process has not been interrupted, the content key information decrypting unit 112 executes step S703, while when the process has been interrupted, the content writing process is terminated. When the power is cut off, the processing obviously ends.

In step S703, it is judged whether or not the content has been outputted in an entire scramble unit. When the content has not been outputted in an entire scramble unit, step S704 is executed, while when the content has been outputted in an entire scramble unit, step S709 is executed.

The content key information decrypting unit 112 assigns a scramble ID to each scramble unit (step S704). More specifically, by uniformly assigning IDs to each scramble unit, the content decrypting unit 116 and/or the content writing unit 119 can use these IDs to recognize how far the writing has progressed. The last scramble ID to be assigned is stored inside the content key information decrypting unit 112 as the last transmitted scramble ID.

The content key information decrypting unit 112 reads the content key from the ECM and transfers the content key and scramble ID to the content decrypting unit 116 (step S705). Here, in consideration of a case where the writing processes for a plurality of contents are interrupted, the content ID of the content to be written may be transferred together with the scramble ID.

The content decrypting unit 116 receives the content key and the scramble ID (step S706).

The content decrypting unit 116 decrypts the encrypted content by using the content key and internally stores the scramble ID of a scramble unit for which writing has been completed (step S707).

The content writing unit 119 writes the content (step S708).

When it has been judged in step S703 that an entire scramble unit has been outputted, the moved content list managing unit 113 properly registers the content ID of the content being written in the MCL (step S709).

It should be noted that while the scramble ID is described as being internally stored when the content that has been encrypted is decrypted by the content decrypting unit 116, the scramble ID may be internally stored when a notification that the content has been written and is successfully stored in the storage medium is received from the content writing unit 119.

Figure 10:
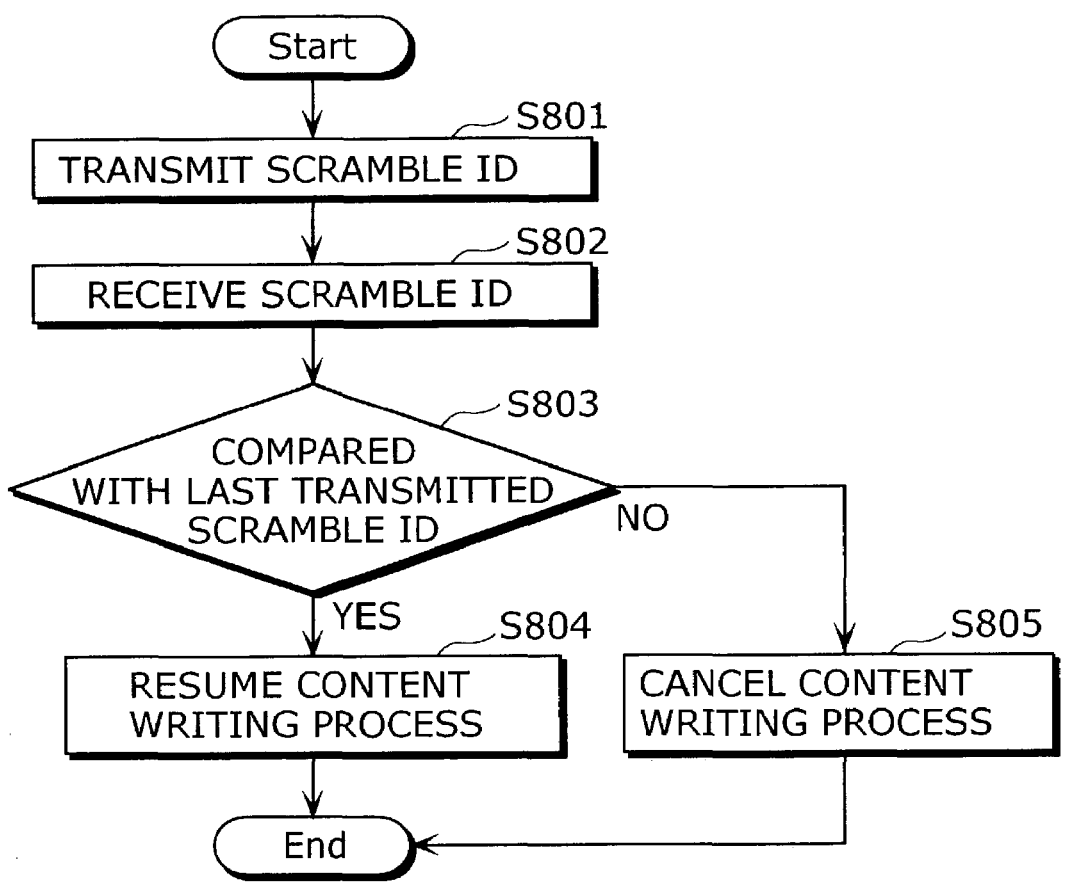
FIG. 10 is a flowchart showing the write resume process of the content using apparatus according to the first embodiment.

FIG. 10 shows the processing that restarts (resumes) the process after the process has been interrupted.

The processing in FIG. 10 commences when a content ID that has been provisionally registered in the MCL is discovered, when a resume request is received from the user, etc.

In FIG. 10, the content decrypting unit 116 transmits the stored scramble ID to the content key information decrypting unit 112 (step S801).

The content key information decrypting unit 112 receives the scramble ID (step S802).

The content key information decrypting unit 112 compares the last transmitted scramble ID that is stored with the scramble ID received from the content decrypting unit 116 (step S803). More specifically, the content key information decrypting unit 112 finds the difference between the scramble ID received from the content decrypting unit 116 and the last transmitted scramble ID, and by judging that the difference is equal to or below a threshold value set in advance, prevents illegal writes from being performed.

When the judgment in step S803 is "YES", which is to say, the difference is equal to or below the threshold value, the resumption of the writing process is permitted and the content writing process is resumed (step S804). It should be noted that the operation following the resumption of the content writing_process was described with reference to FIG. 9, and so a repeated description of such is omitted here.

When the judgment in step S803 is "NO", which is to say, the difference is above the threshold value, the content writing process is cancelled (step S805).

In this way, in the present content using system 1, when a content is written, scramble IDs are assigned to indicate the progress of the write, so that if the power is cut off during a write or the user interrupts the write, the write can be safely resumed without the security being compromised.

Second Embodiment

The following describes a second embodiment of the present invention, with reference to the attached drawings.

Figure 11:
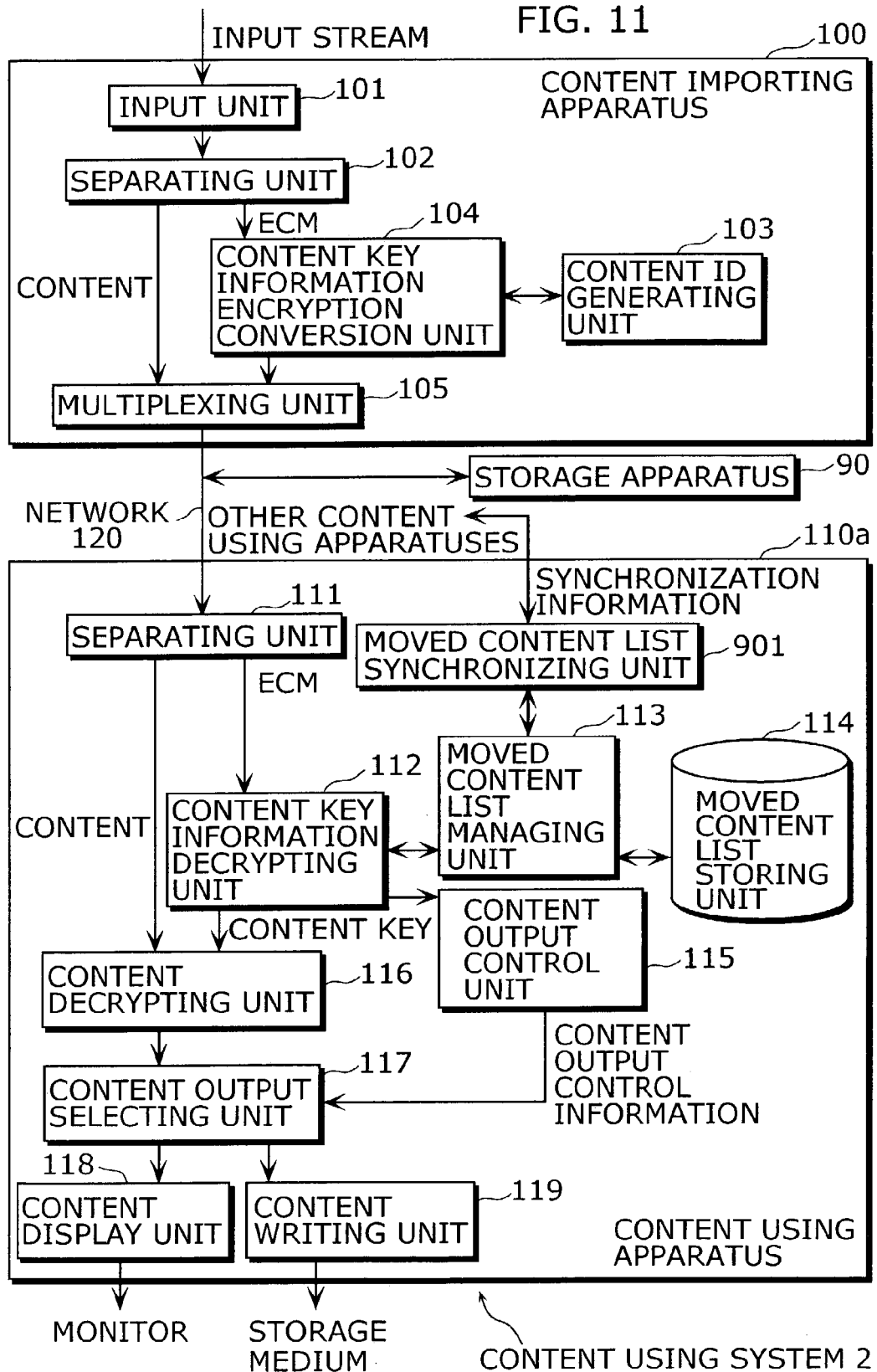
FIG. 11 is a functional block diagram showing the constructions of the content importing apparatus and the content using apparatus according to the second embodiment.

FIG. 11 is a block diagram showing the construction of a content using system 2 according to the second embodiment of the present invention. It should be noted that in FIG. 11, construction elements that are the same as in the content using system 1 of the first embodiment shown in FIG. 3 have already been described with reference to FIG. 3, so that such construction elements have been given the same reference numerals as in FIG. 3 and description of such has been omitted.

The content using system 2 shown in FIG. 11 is characterized as follows. While the content importing apparatus 100 has the same construction as in the content using system 1 of the first embodiment of the present invention, each content using apparatus 110a further comprises a moved content list synchronizing unit 901 and communicates with other content using apparatuses 110a that are connected to the network so that the MCL is synchronized between a plurality of content using apparatuses 110a.

The moved content list synchronizing unit 901 synchronizes the MCL by transmitting and receiving synchronization information for the MCL to and from other content using apparatuses 110a and notifies the moved content list managing unit 113 of the result. More specifically, at the timing when a content is written and the MCL is updated, the moved content list managing unit 113 transfers synchronization information for the updated content ID to the moved content list synchronizing unit 901. The moved content list synchronizing unit 901 transmits this synchronization information to the other content using apparatuses 110a connected to the network. The moved content list synchronizing unit 901 of each of the other content using apparatuses 110a that receive this synchronization information transfers the synchronization information to the moved content list managing unit 113 and by reflecting this information in the MCL in the moved content list storing unit 114, the synchronization of the MCLs in different content using apparatuses 110a is ensured. As one example, the synchronizing information (synchronization information) is information that has been recorded in the MCL and includes the content ID of the content that has been written. As one example of the synchronization method, synchronization information may be broadcast on the network.

Figure 12:
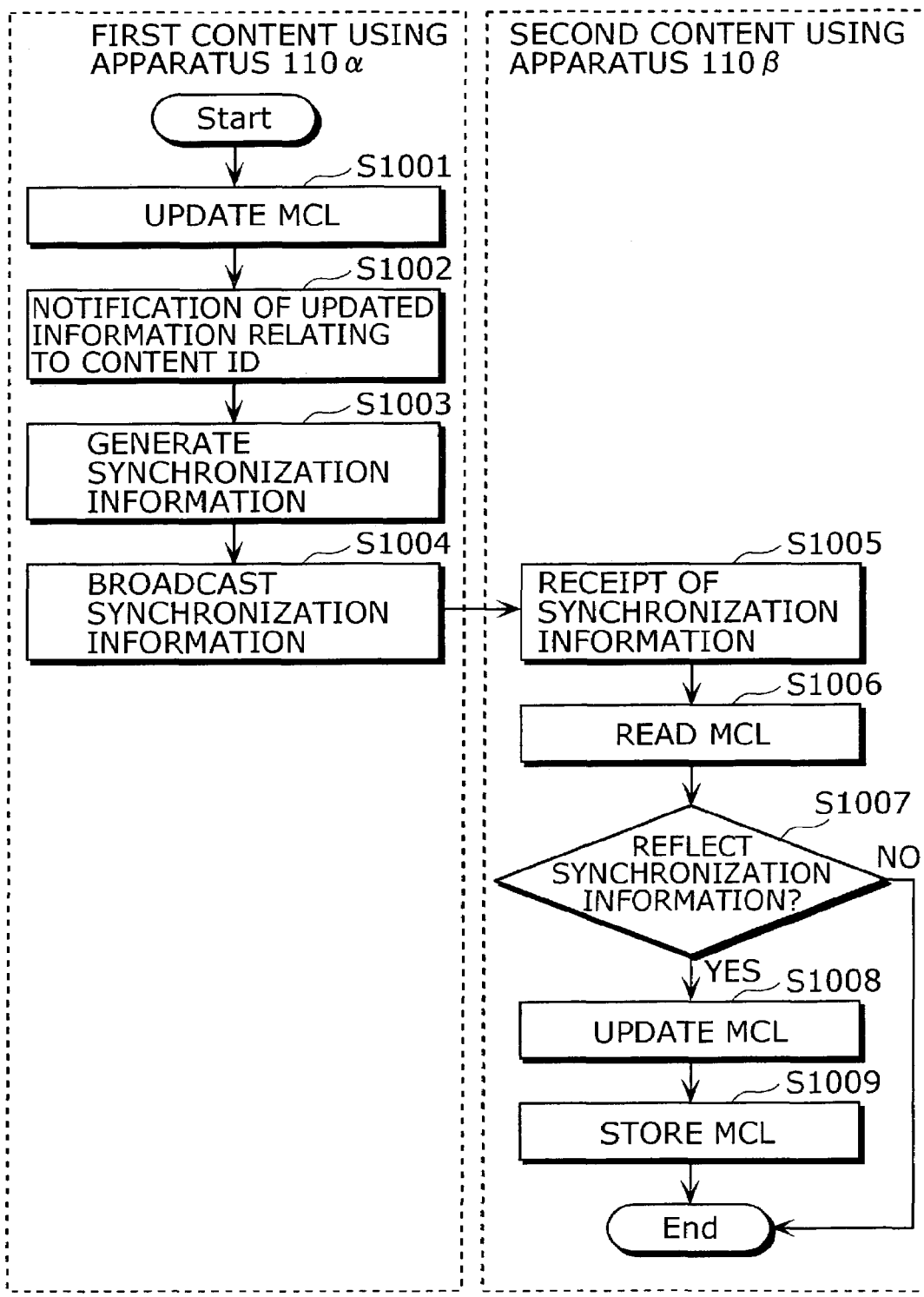
FIG. 12 is a flowchart showing the moved content list synchronization process performed between the content using apparatuses according to the second embodiment.

FIG. 12 shows a sequence when the moved content list synchronizing unit 901 synchronizes the MCL with the moved content list synchronizing units 901 of other content using apparatuses 110a connected to the network. In FIG. 12, the updating source of the MCL (the content using apparatus 110a that updates the MCL and broadcasts the synchronization information) is set as the first content using apparatus 110α while the updating destination (the content using apparatus 110a that receives the broadcast synchronization information and updates the MCL) is set as a second content using apparatus 110β. It should be noted that there may be a plurality of content using apparatuses 110a that correspond to the updating destination for the MCL, with the second content using apparatus 110β being used to represent these content using apparatuses 110a in the following explanation.

When writing a content, the moved content list managing unit 113 of the first content using apparatus 110α obtains the content ID from the content key information decrypting unit 112 and updates the MCL read from the moved content list storing unit 114 (step S1001). More specifically, when the content with the content ID "CONTENT-ID-12345" is written, as shown in FIG. 13, information (Content ID, number of writes, etc.) relating to the content ID "CONTENT-ID-12345" is added to the MCL stored in the first content using apparatus 110α. At this point, as shown in FIG. 14, the MCL stored in the second content using apparatus 110β has not been notified of the writing of the content with the content ID "CONTENT-ID-12345" by the first content using apparatus 110α, so that there is no record for "CONTENT-ID-12345" in this MCL.

It should be noted that in the MCL shown in FIG. 13, the number of writes that have been performed (the number of writes) and the maximum number of writes that are permitted (maximum number of writes) are recorded as the information relating to the number of writes of a content. Accordingly, when the reproduction of a content is controlled, the reproduction of the content is permitted so long as the number of writes does not exceed the maximum number of writes. Once the maximum number of writes has been reached, control is performed so as to prohibit the reproduction of the content. The number of writes is recorded as the number of writes that have been performed, but it is possible to alternatively record the remaining number of permitted writes, with this number being decreased every time a write is performed. In this case, the writing and reproduction of a content become prohibited when the number of writes reaches zero.

The moved content list managing unit 113 of the first content using apparatus 110α notifies the moved content list synchronizing unit 901 of information relating to the updated content ID (step S1002). More specifically, the moved content list managing unit 113 of the first content using apparatus 110α notifies the moved content list synchronizing unit 901 of the entire record with the content ID "CONTENT-ID-12345" in the MCL of the first content using apparatus 110α shown in FIG. 13.

The moved content list synchronizing unit 901 of the first content using apparatus 110α generates the synchronization information from the information relating to the content ID "CONTENT-ID-12345" received from the moved content list managing unit 113 (step S1003). The synchronization information 1301 shown in FIG. 15 is one example of this synchronization information. The synchronization information 1301 is composed of the information described below.

The session ID (SESSION-ID) is set for each content using apparatus 110a every time the synchronization information is generated. More specifically, the session ID is an ID which is realized by a counter to which "1" is added every time synchronization information is generated.

The content using apparatus ID (TERMINAL-ID) is internally stored in the content using apparatus 110a and is an ID for identifying the content using apparatus 110a. As one example, when two content using apparatuses 110a simultaneously write a content with the same content ID and synchronization information is broadcast by both content using apparatuses 110a, these content using apparatus IDs are used as information for distinguishing between the two content using apparatuses 110a.

The content ID (CONTENT-ID) is the content ID of the content that has been written.

The number of writes, the write destination and write path are all fundamentally the same as in the information in the MCL. It should be noted that the MCL itself may be used as the synchronization information, although the synchronization information 1301 shown in FIG. 15 is used as the synchronization information in the explanation below.

Next, the moved content list synchronizing unit 901 of the first content using apparatus 110α transmits the generated synchronization information 1301 (step S1004). More specifically, the moved content list synchronizing unit 901 of the first content using apparatus 110α broadcasts the synchronization information 1301 on the network.

The moved content list synchronizing unit 901 of the second content using apparatus 110β receives the broadcast synchronization information 1301 and requests the moved content list managing unit 113 to read the MCL (step S1005).

The MCL is read from the moved content list storing unit 114, and the moved content list managing unit 113 of the second content using apparatus 110β calculates the hash of the MCL, compares the calculated value with the value stored by the moved content list managing unit 113 to confirm the authenticity of the MCL, and transfers the content of the MCL to the moved content list synchronizing unit 901 (step S1006). It should be noted that when an MCL is not present in the moved content list storing unit 114, the moved content list managing unit 113 generates (initializes) the MCL.

The moved content list synchronizing unit 901 of the second content using apparatus 110β confirms the session ID and the content using apparatus ID, etc., compares the content of the MCL received from the moved content list managing unit 113 with the synchronization information 1301, and judges whether or not the synchronization information 1301 should be reflected in the MCL (step S1007). More specifically, the moved content list synchronizing unit 901 judges whether the content of the synchronization information 1301 is not included in the content of the MCL or whether the content of the MCL has not been updated.

When the judgment in step S1007 is "YES", which is to say, when the moved content list synchronizing unit 901 judges that it is necessary to update the MCL, the moved content list synchronizing unit 901 notifies the moved content list managing unit 113 of the content of the synchronization information 1301 and the moved content list managing unit 113 updates the MCL by using the content of the synchronization information 1301 (step S1008). More specifically, the content of the MCL stored by the second content using apparatus 110β shown in FIG. 14 is synchronized so as to match the content of the MCL stored by the first content using apparatus 110α shown in FIG. 13.

The moved content list managing unit 113 of the second content using apparatus 110β recalculates the hash of the MCL, internally stores the hash value, and writes the MCL into the moved content list storing unit 114 (step S1009).

When the judgment in step S1007 is "NO", which is to say, when the moved content list synchronizing unit 901 judges that it is not necessary to update the MCL, the present synchronization process is terminated. More specifically, it is possible for the synchronization information 1301 to be repeatedly broadcast a plurality of times, so that a process is performed that refers to the session ID of the synchronization information 1301 and the content using apparatus ID of the synchronization information transmission source and discards unnecessary synchronization information 1301 when the same synchronization information 1301 has been received a plurality of times.

It should be noted that the content importing process of the content importing apparatus 100, the content writing process of the content using apparatus 110a, and the content reproduction process of the content using apparatus 110a are the same as in the first embodiment, and since these processes have already been described, a repeated description of such is omitted here.

In this way, with the present content using system 2, the MCL is synchronized between a plurality of content using apparatuses 110a on a network. This means that while limitations such as the permitted number of content writes are imposed separately for content using apparatuses 110a in the content using system 1 shown in the first embodiment of the present invention, in the content using system 2, limitations can be imposed on the entire network, which is to say, on all of a plurality of content using apparatuses 110a.

Third Embodiment

The following describes a third embodiment of the present invention with reference to the attached drawings.

Figure 16:
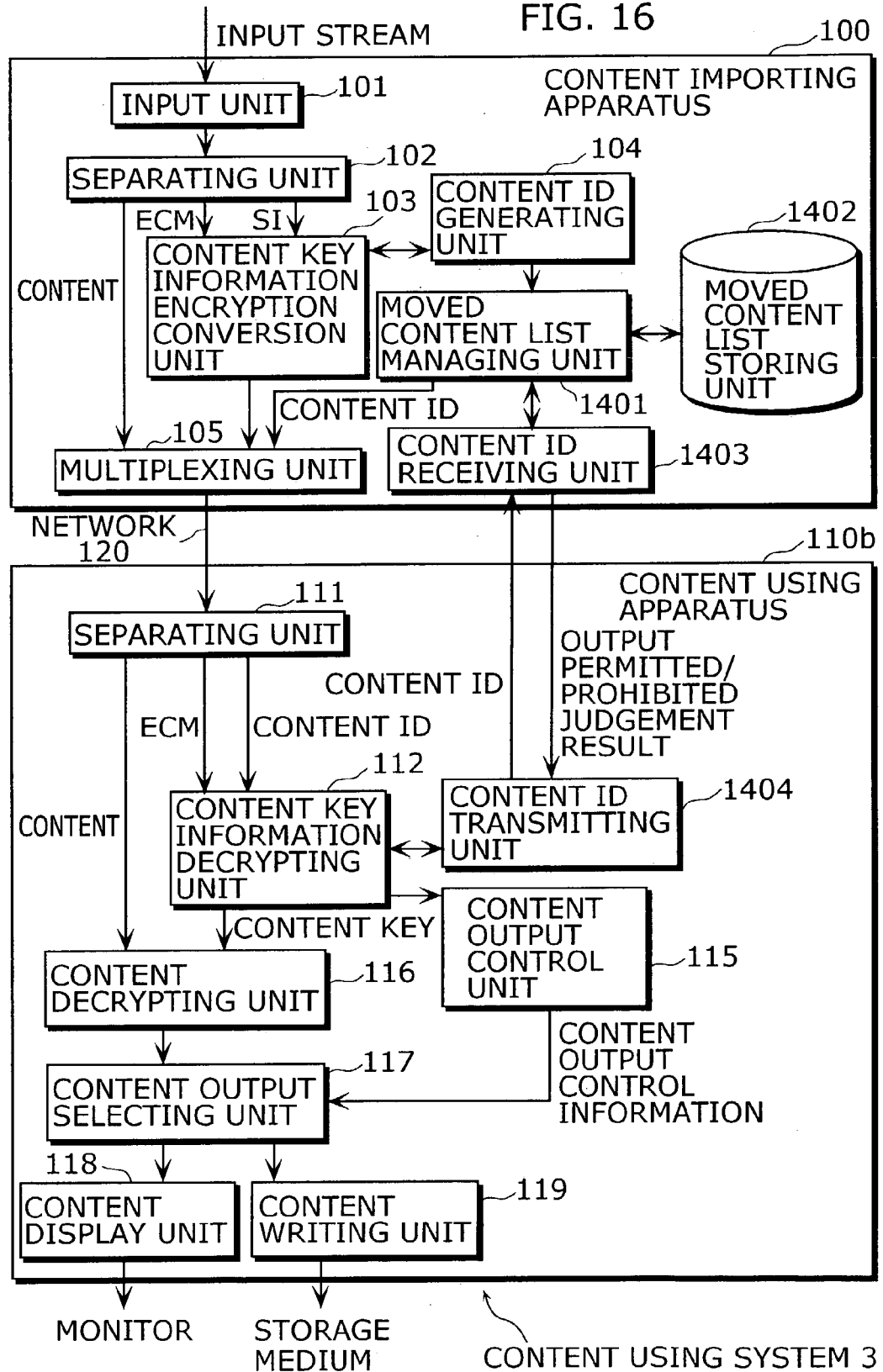
FIG. 16 is a functional block diagram showing the constructions of the content importing apparatus and the content using apparatus according to the third embodiment.

FIG. 16 is a block diagram showing the construction of a content using system 3 according to the third embodiment of the present invention. It should be noted that in FIG. 16 construction elements that are the same as in the content using system 1 of the first embodiment shown in FIG. 3 have already been described with reference to FIG. 3, so that such construction elements have been given the same reference numerals as in FIG. 3 and description of such has been omitted.

Compared to the content using system 1 of the first embodiment of the present invention, the content using system 3 shown in FIG. 16 is characterized as follows. The content importing apparatus 100 further includes a moved content list managing unit 1401, a moved content list storing unit 1402 and a content ID receiving unit 1403, while a content using apparatus 110b includes the separating unit 111, the content key information decrypting unit 112, the content output control unit 115, the content decrypting unit 116, the content output selecting unit 117, the content display unit 118 and the content writing unit 119 as content output units, and a content ID transmitting unit 1404. The content importing apparatus 100 manages the MCL, so that when the content using apparatus 110b writes a content or displays (reproduces) a content, the content using apparatus 110b inquires the content importing apparatus 100 whether the writing is permitted or prohibited, and the writing and display of the content is controlled based on the result of a judgment by the content importing apparatus 100 as to whether the writing is permitted or prohibited.

All of the content IDs that have been assigned to contents that have been imported into the content using system 3 are registered in the MCL managed by the content using system 3, and in the MCL, only the content IDs of contents that have been written are marked. This means that the content ID generating unit 104 generates a content ID whenever a content is newly imported and that it is necessary to inform the moved content list managing unit 1401 of the new content ID.

The moved content list managing unit 1401 of the content importing apparatus 100 reads the MCL stored in the moved content list storing unit 1402, refers to the MCL, and performs an update process and the like. More specifically, the moved content list managing unit 1401 performs processing that receives a content ID to be registered in the content ID generating unit 104 from the content ID generating unit 104, and registers the content ID in the MCL, etc. When the content ID of a content to be written is received from the content using apparatus 110b, the moved content list managing unit 1401 judges whether a write is permitted or prohibited, and updates the MCL. Also, when an MCL is not stored in the moved content list storing unit 1402, an MCL is newly generated and initialized. It should be noted that the methods for calculating the hash of the MCL and securely managing the hash value are the same as those described in the first embodiment of the present invention, so a repeated description of such is omitted here.

The moved content list storing unit 1402 in the content importing apparatus 100 is the part that stores the MCL and is realized by a hard disk drive or the like.

The content ID receiving unit 1403 in the content importing apparatus 100 performs a process that receives the content ID of a content to be written or reproduced from the content ID transmitting unit 1404 of a content using apparatus 110b, transfers the content ID to the moved content list managing unit 1401, and transmits the judgment result, which shows that the writing is permitted or prohibited and which was received from the moved content list managing unit 1401 to the content ID transmitting unit 1404 of the content using apparatus 110b.

The content ID transmitting unit 1404 in the content using apparatus 110b performs a process that receives the content ID of the content to be written or reproduced from the content key information decrypting unit 112, transmits the content ID to the content ID receiving unit 1403 of the content importing apparatus 100, receives the judgment result, which shows that the writing is permitted or prohibited, and transfers the judgment result to the content key information decrypting unit 112.

Figure 17:
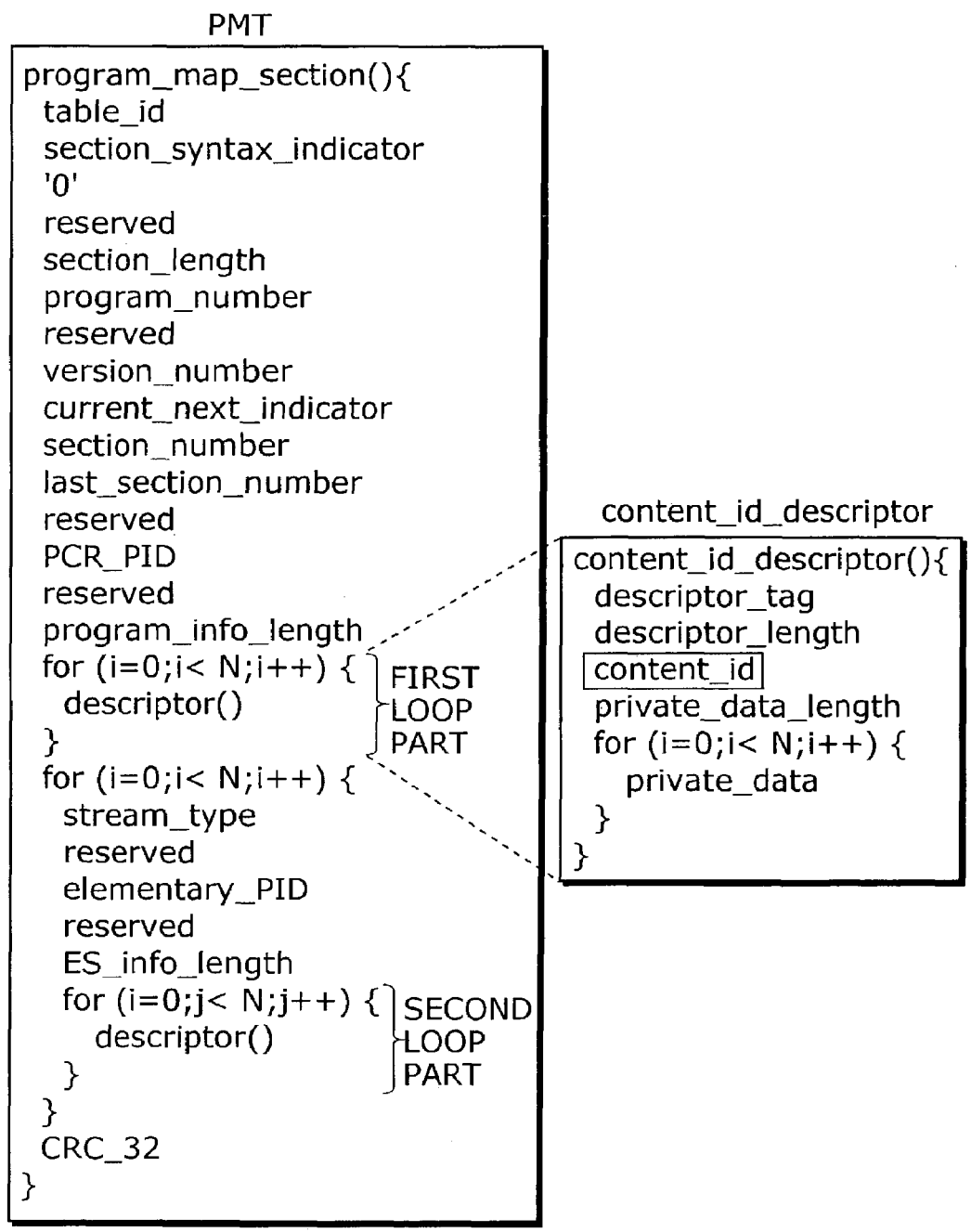
FIG. 17 shows the compositions of the PMT and of the content_id_descriptor in which the content ID is written according to the third embodiment.

The content using system 1 of the first embodiment of the present invention and the content using system 2 of the second embodiment of the present invention are examples where the content ID is set in the ECM, although the content ID is set in information aside from the ECM (content key information) in this embodiment. As examples of such information aside from the ECM, a method where the content ID is set in the PMT or a method where the content ID is set as a private section and the content is pointed to from the PMT by a PID may be used. As one example of setting the content ID in the PMT, FIG. 17 shows a case where a content_id_descriptor, which is defined so that a content ID can be set, is inserted in a first loop part of a descriptor part of the PMT. Any desired descriptor that can be defined on a system-by-system basis can be set in the descriptor part of the PMT, and a digital copy control descriptor in which information relating to digital copying is written and a CA descriptor or the like may be inserted in this PMT descriptor part. In the present content using system, a content_id_descriptor is newly defined in this descriptor part, and the content ID is set in a content_id field in this content_id_descriptor. The decision as to whether this descriptor is set in the first loop part or in the second loop part can be made freely in each system, but the descriptor is normally set in the first loop part when there are parameters for each program, and in the second loop part when there are parameters for each elementary stream. The following describes an example where the content ID is inserted in the PMT.

However, when the content ID is inserted somewhere aside from the ECM as described above, there is the risk of the content ID being illegally replaced or tampered with, so that it is necessary to securely bind the content and the content ID. This means that when the content key information encryption conversion unit 103 in the content importing apparatus 100 converts the encryption of the ECM, the conversion of the encryption is performed with the content ID having been associated to the ECM so that the content and the content ID are securely bound. As specific examples, a method where the result of an XOR (Exclusive OR) taken for the network key and the content ID or the result of linking the network key and the content ID is used as the encryption key for re-encrypting the ECM, a method where a hash is calculated for the content ID by using a hash algorithm, such as SHA-1, and the resulting hash value is inserted in the ECM, or a method where the ECM is encrypted by using the content ID and then encrypted by using the network key may be used. The following describes an example where an XOR is taken for the network key and the content ID and the result is used as an encryption key for re-encrypting the ECM.

The operation of the content using system 3 with the construction as described above is described below with reference to FIGS. 18 and 20.

Figure 18:
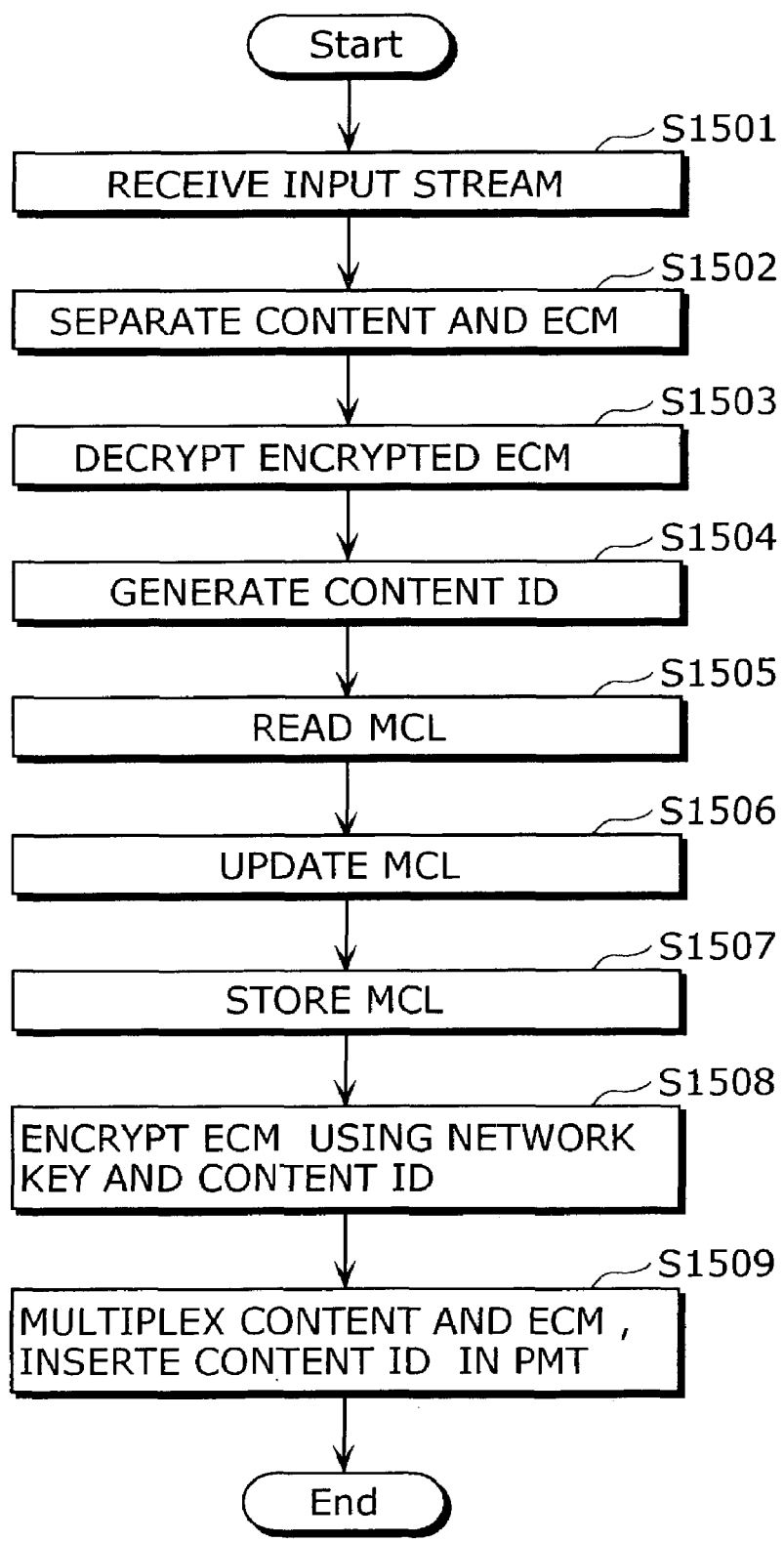
FIG. 18 is a flowchart showing the content importing process of the content importing apparatus according to the third embodiment.

FIG. 18 is a flowchart showing the content importing process of the content importing apparatus 100.

The input unit 101 receives a transport stream from a broadcast wave (step S1501).

The separating unit 102 receives the transport stream from the input unit 101, refers to the PIDs of the TS packets, and separates the TS packets of the content and the TS packets of the ECM (step S1502). The PIDs showing the TS packets of the content and the ECM are written in the PMT, so that the separating unit 102 refers to the PMT when separating the TS packets. Also, in order to generate the content ID, the separating unit 102 separates the SI information. As one example, this information is an EIT (Event Information Table) in which event information is written and a TOT (Time Offset Table) in which the present time is written.

The content key information encryption conversion unit 103 receives the TS packets of the ECM, reconstructs the ECM section, and decrypts the encrypted ECM by using the work key (step S1503).

The content key information encryption conversion unit 103 sends a content ID generation request and the data (information on the EIT, TOT, etc.) that has been distributed together with the content to the content ID generating unit 104, with the content ID generating unit 104 receiving this information and request and generating a content ID (step S1504). Here, as one example, the content ID generating unit 104 generates the content ID from the service_id of the EIT and the present time in the TOT. In this case, content IDs are assigned in units of time. In addition, if at this point the content ID is generated in association with a unique ID that is internally stored in the content importing apparatus 100, it is possible to generate a content ID that is globally unique. The content ID that is generated in this way is transferred to the moved content list managing unit 1401 in order to update the MCL and is transferred to the multiplexing unit 105 in order to generate a content_id_descriptor in which the content ID is written. Also, in order to securely bind the content and the content ID, the content ID is transferred to the content key information encryption conversion unit 103.

Upon receiving the content ID, etc., from the content ID generating unit 104, the moved content list managing unit 1401 reads the MCL from the moved content list storing unit 1402 (step S1505) and registers the content ID received from the content ID generating unit 104 (step S1506). It should be noted that when the MCL is not present in the moved content list storing unit 1402, an MCL is generated and initialized.

Here, the MCL is composed as shown in FIG. 19. In the MCL shown in FIG. 19, the number of writes is registered as the number of times a content has been written onto a storage medium so far. In addition, a maximum number of writes per unit time (maximum times/period), an interval ("penalty period") for performing control so that the writing of a content is prohibited for a fixed period following the writing of the content, and a time showing when a previous write was performed (previous write time) are recorded in the MCL. As one example, for the content with the content ID "CONTENT-ID-11111", the MCL shows that one write has been performed and the maximum number of writes per unit time is set at "2/Day", so that it is possible to write the content twice during a single day and this content may be written one further time. The penalty period is set at "1 hour". As a result control is performed to impose a penalty so that the writing of the content onto a storage medium is prohibited for one hour following the previous write time "22:22:22", which is to say, until "23:22:22". It should be noted that in the present embodiment, the maximum number of writes per unit time and the penalty period are set separately for each content, although it is possible to set such parameters in each MCL and to set common restrictions for all of the contents on an MCL basis.

In the present embodiment, the number of writes is incremented (with the number of writes of contents that have not been written remaining at zero) as the process for marking contents that have been written, so that it is possible to distinguish between contents that have been written and contents that have never been written.

The moved content list managing unit 1401 writes the updated MCL in the moved content list storing unit 1402 (step S1507).

The content key information encryption conversion unit 103 uses the content ID and the network key received from the content ID generating unit 104 to re-encrypt the decrypted ECM (step S1508). More specifically, the content key information encryption conversion unit 103 takes an XOR for the content ID and an encryption key that is internally stored and has been shared in advance on the network, and re-encrypts the ECM by using the result of the XOR. In addition, the content key information encryption conversion unit 103 converts the re-encrypted ECM into TS packets and transfers the TS packets to the multiplexing unit 105.

The multiplexing unit 105 multiplexes the TS packets of the content received from the separating unit 102 and the TS packets of the ECM, whose encryption has been converted, received from the content key information encryption conversion unit 103. The multiplexing unit 105 also generates a content_id_descriptor from the content ID received from the content ID generating unit 104 and inserts this content_id_descriptor into the descriptor part of the PMT (step S1509).

In this way, in the content importing apparatus 100, the encryption of the ECM is converted so as to generate a content that is bound to the network, the content ID is set in the PMT, and the re-encrypted ECM is multiplexed with the content. The content ID of the imported content is also registered in the MCL.

Figure 20:
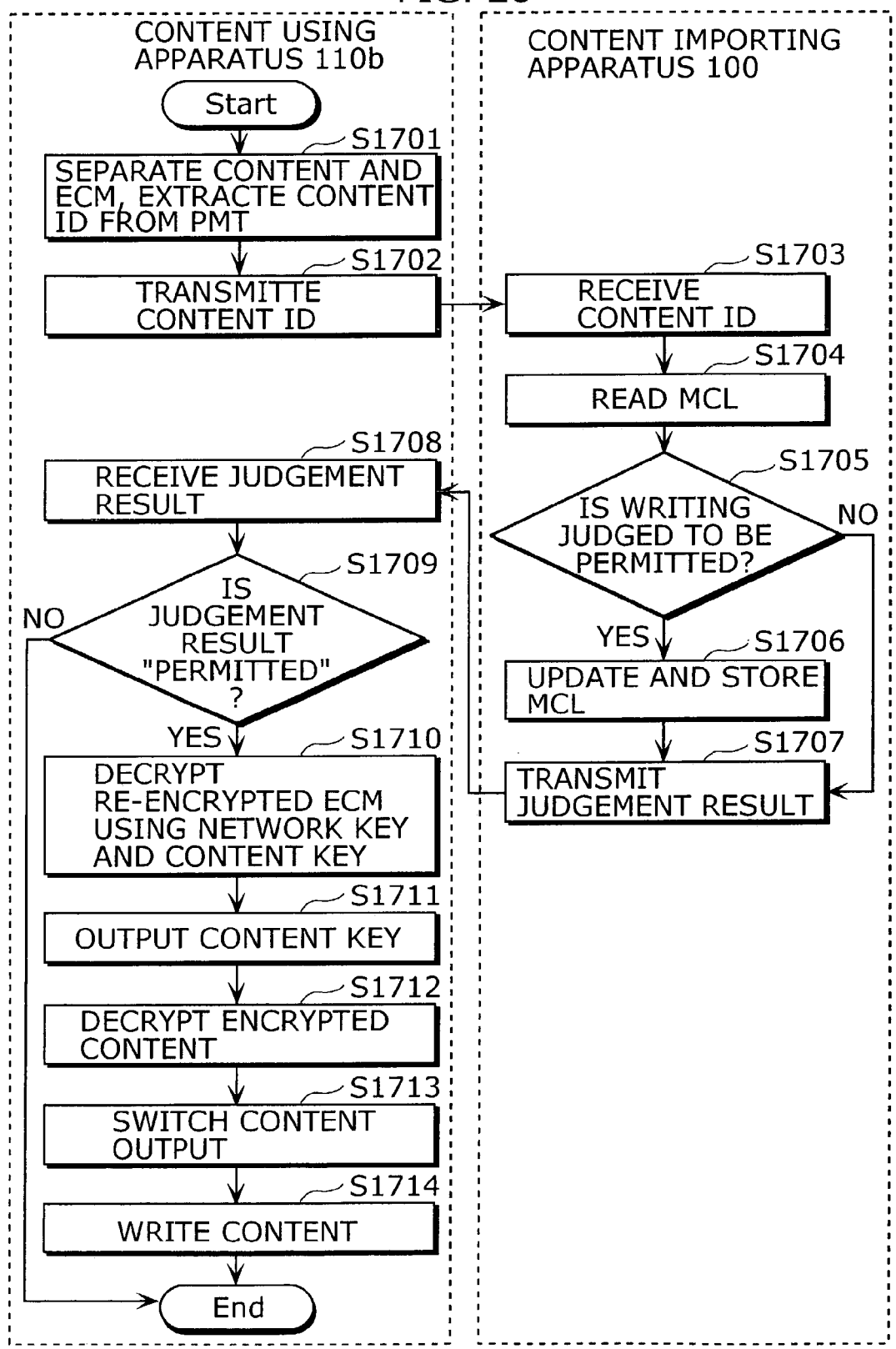
FIG. 20 is a flowchart showing the content writing process of the content using apparatus according to the third embodiment.

On the other hand, FIG. 20 is a flowchart showing the content writing process performed by the content using apparatus 110*b*. Since a process that inquires the content importing apparatus 100 to see whether the writing of the content is permitted or prohibited is also performed, the processing of the content importing apparatus 100 is also shown in FIG. 20.

In the separating unit 111, the content and the ECM are separated from the transport stream received from the content importing apparatus 100. The separating unit 111 also separates the PMT, obtains the content ID from the content_id_descriptor of the descriptor part in the PMT, and notifies the content key information decrypting unit 112 (step S1701).

The content key information decrypting unit 112 transfers the content ID received from the separating unit 111 to the content ID transmitting unit 1404, and the content ID transmitting unit 1404 transmits the content ID to the content importing apparatus 100 (step S1702).

The content ID receiving unit 1403 of the content importing apparatus 100 receives the content ID (step S1703) and transfers the received content ID to the moved content list managing unit 1401.

The moved content list managing unit 1401 reads the MCL from the moved content list storing unit 1402 (step S1704).

The moved content list managing unit 1401 judges whether the external writing of the content is permitted or prohibited based on the content ID and the MCL (step S1705). More specifically, the moved content list managing unit 1401 performs a process that refers to the maximum number of writes per unit time and the penalty time for the content ID that are registered in the MCL, and judges whether the limitations are satisfied.

When the judgment in step S1705 is "YES", which is to say, the judgment result is that the write is permitted, the moved content list managing unit 1401 adds one to the number of writes in the MCL, updates the MCL, and stores the updated MCL in the moved content list storing unit 1402 (step S1706). The moved content list managing unit 1401 also transmits the judgment result to the content ID receiving unit 1403.

When the judgment in step S1705 is "NO", which is to say, the judgment result is that the write is prohibited, the moved content list managing unit 1401 transmits the judgment result to the content ID receiving unit 1403.

The content ID receiving unit 1403 of the content importing apparatus 100 transmits the judgment result about the writing that has been received from the moved content list managing unit 1401 to the content using apparatus 110*b* (step S1707).

The content ID transmitting unit 1404 of the content using apparatus 110*b* receives the judgment result showing whether the writing is permitted from the content using apparatus 110*b* and transfers the judgment result to the content key information decrypting unit 112 (step S1708).

The content key information decrypting unit 112 determines whether or not the writing process for the content is to be performed, in accordance with the judgment result showing whether or not the writing is permitted (step S1709).

When the judgment in step S1709 is "YES", which is to say, when the judgment result shows that the writing is permitted, the content key information decrypting unit 112 obtains the re-encrypted ECM from the separating unit 111, takes an XOR for the network key and the content ID, and uses the result to decrypt the ECM (step S1710).

The content key information decrypting unit 112 obtains the content key from the ECM and transfers the content key to the content decrypting unit 116, in addition to instructing the content output control unit 115 to transfer the content in question to the content writing unit 119 (step S1711). By doing so, the content output control unit 115 controls the content output selecting unit 117 so as to write the content.

The content decrypting unit 116 decrypts (descrambles) the TS packets obtained from the separating unit 111 by using the content key obtained from the content key information decrypting unit 112 (step S1712).

Based on control by the content output control unit 115, the content output selecting unit 117 transfers the content to the content writing unit 119 in order to write the content (step S1713).

The content writing unit 119 writes the content onto a storage medium (step S1714). More specifically, the content writing unit 119 encrypts the content in a suitable method for a storage medium, such as a DVD-RAM or D-VHS, converts the format, and writes the content onto the storage medium.

When the judgment in step S1709 is "NO", which is to say, when the judgment result shows that the writing is prohibited, the content key information decrypting unit 112 cancels the content writing process.

In this way, in the present content using system 3, a content ID is assigned to a content bound to the network, and at the same time the content ID is registered in the MCL that is managed in the content importing apparatus 100. When writing a content, the content using apparatus 110*b* inquires the content importing apparatus 100 as to whether the writing is permitted or prohibited, and the content importing apparatus 100 uses the MCL to judge whether the writing is permitted or prohibited, thereby imposing limitations on the writing of contents.

The content reproduction (display) process in the content using apparatus 110b is performed with the same processing flow as was shown in FIG. 20, and so a repeated description of such is omitted. However, it is necessary to amend the procedure so that the processing in step S1706 is never performed and the processing in step S1712 has the content output selecting unit 117 transfer, in accordance with an instruction from the content output control unit 115, the content to the content display unit 118 so that the content is reproduced.

Fourth Embodiment

The following describes a fourth embodiment of the present invention with reference to the attached drawings.

Figure 21:
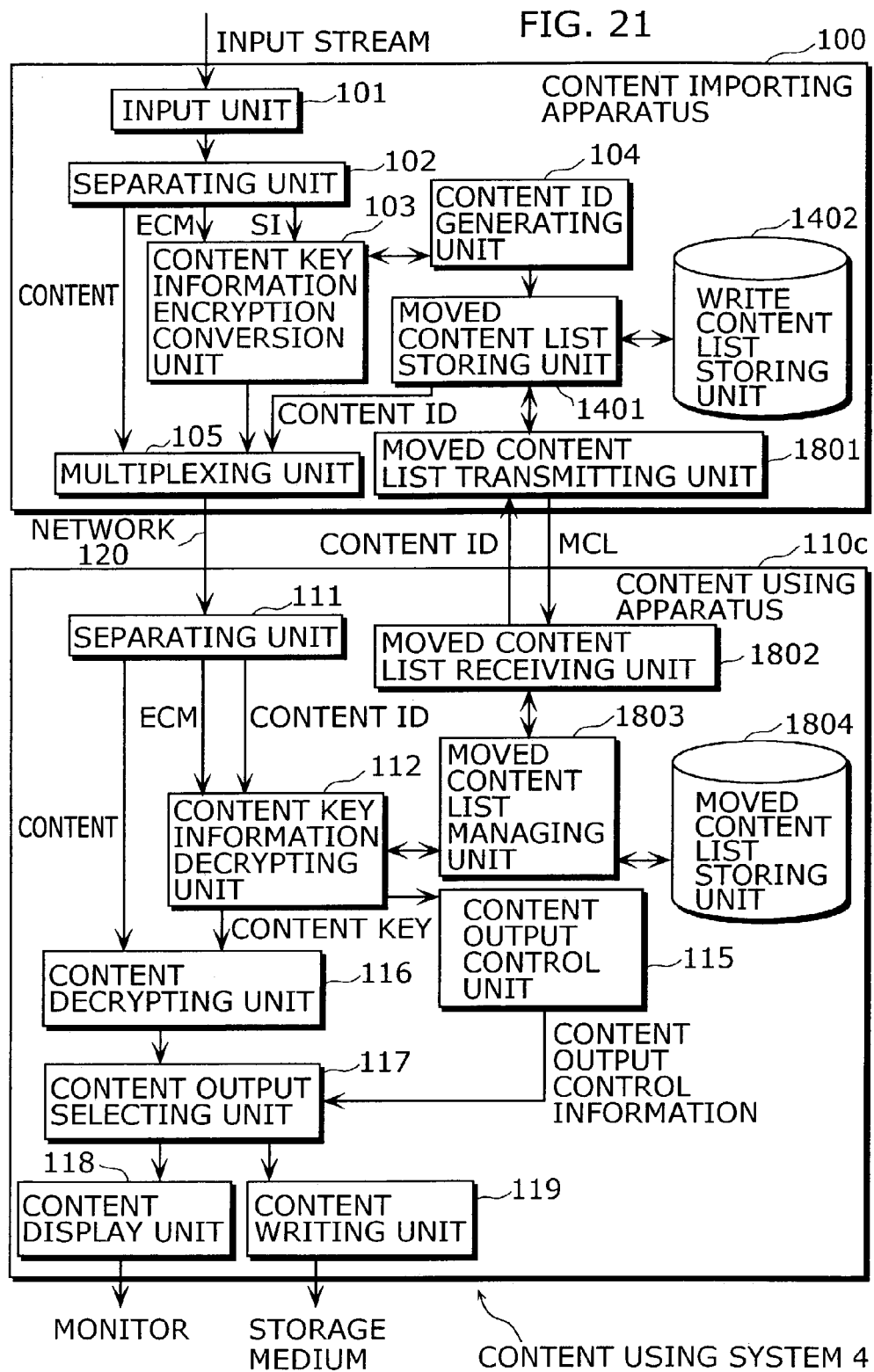
FIG. 21 is a functional block diagram showing the constructions of the content importing apparatus and the content using apparatus according to the third embodiment.

FIG. 21 is a block diagram showing the construction of a content using system 4 according to the fourth embodiment of the present invention. It should be noted that in FIG. 21 construction elements that are the same as in the content using system 3 of the third embodiment shown in FIG. 16 have already been described with reference to FIG. 16, so that such construction elements have been given the same reference numerals as in FIG. 16 and description of such has been omitted.

Compared to the content using system 3 of the third embodiment of the present invention, the content using system 4 shown in FIG. 21 is characterized as follows. The content importing apparatus 100 has a moved content list transmitting unit 1801 in place of the content ID receiving unit 1403. In addition, the content using apparatus 110c has a moved content list receiving unit 1802 in place of the content ID transmitting unit 1404, and also includes a moved content list managing unit 1803 and a moved content list storing unit 1804. The content importing apparatus 100 manages the MCL, and the content using apparatus 110c receives a copy of the MCL from the content importing apparatus 100 and controls the writing and displaying of contents based on the received MCL.

When the MCL stored in the moved content list storing unit 1402 has been updated, the moved content list transmitting unit 1801 in the content importing apparatus 100 transmits the MCL to the content using apparatus 110c. More specifically, the MCL is transmitted to every content using apparatus 110c when (1) a content ID has been registered in the MCL due to the content importing apparatus 100 newly importing a content or (2) a content has been written by a content using apparatus 110c, the content ID of the written content has been received from the content using apparatus 110c and marking has been performed for the content ID in question in the MCL to indicate the write. Here, the MCL may be broadcast as one example of the transmission method.

When a content has been written, the moved content list receiving unit 1802 in the content using apparatus 110c performs a process that transmits the content ID of the written content to the content importing apparatus 100 and, when the MCL has been updated in the content importing apparatus 100, receives the new MCL whose version number has been updated.

The moved content list managing unit 1803 in the content using apparatus 110c manages the MCL in the moved content list storing unit 1804. More specifically, when a content has been written, the moved content list managing unit 1803 performs a process that transfers the content ID of the written content to the moved content list receiving unit 1802, receives the MCL that has been received by the moved content list receiving unit 1802, and updates the MCL in the moved content list storing unit 1804.

The moved content list storing unit 1804 in the content using apparatus 110c is the unit that stores the MCL and is realized by a hard disk drive or the like.

Figure 22:
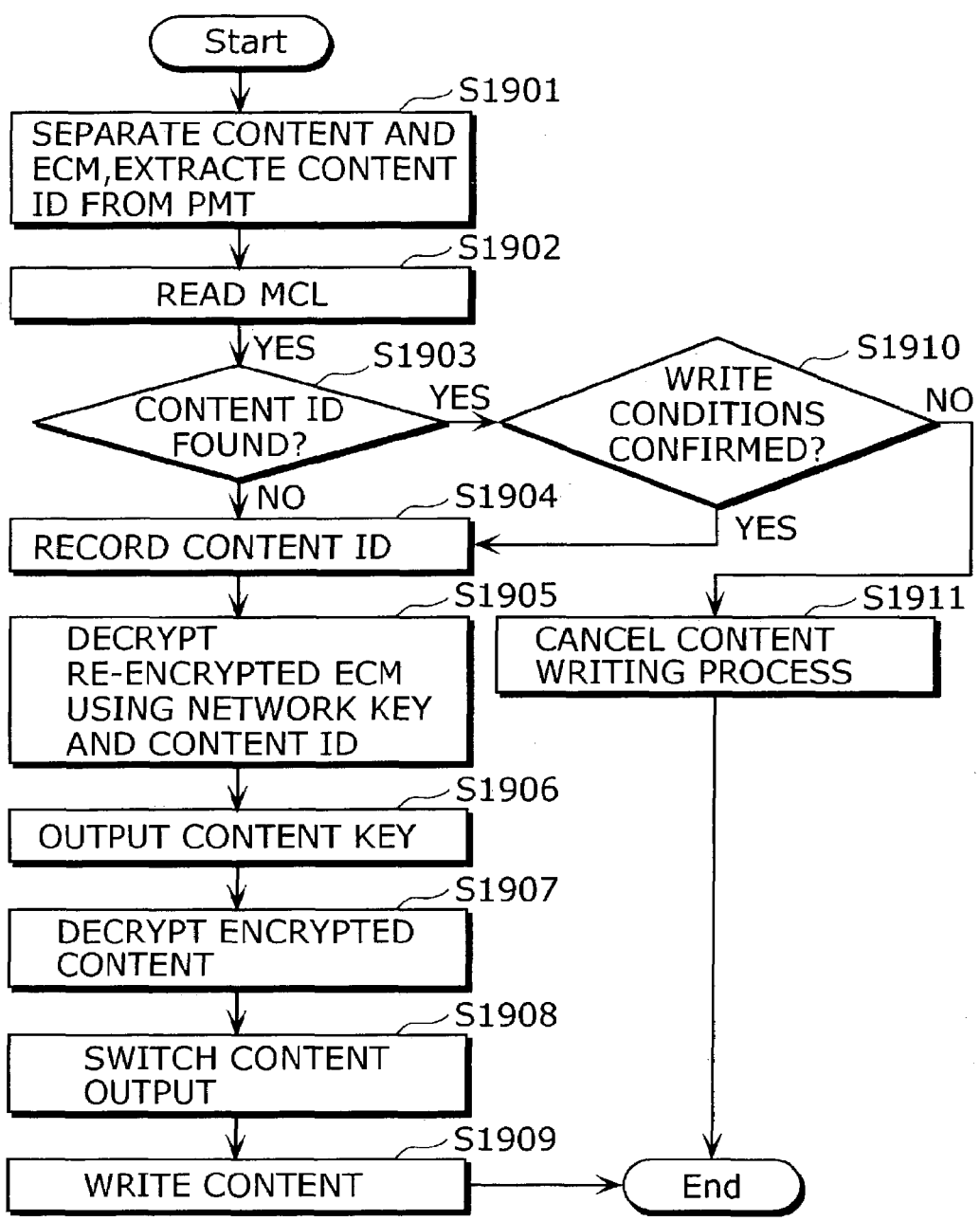
FIG. 22 is a flowchart showing the content writing process of the content using apparatus according to the fourth embodiment.
Figure 23:
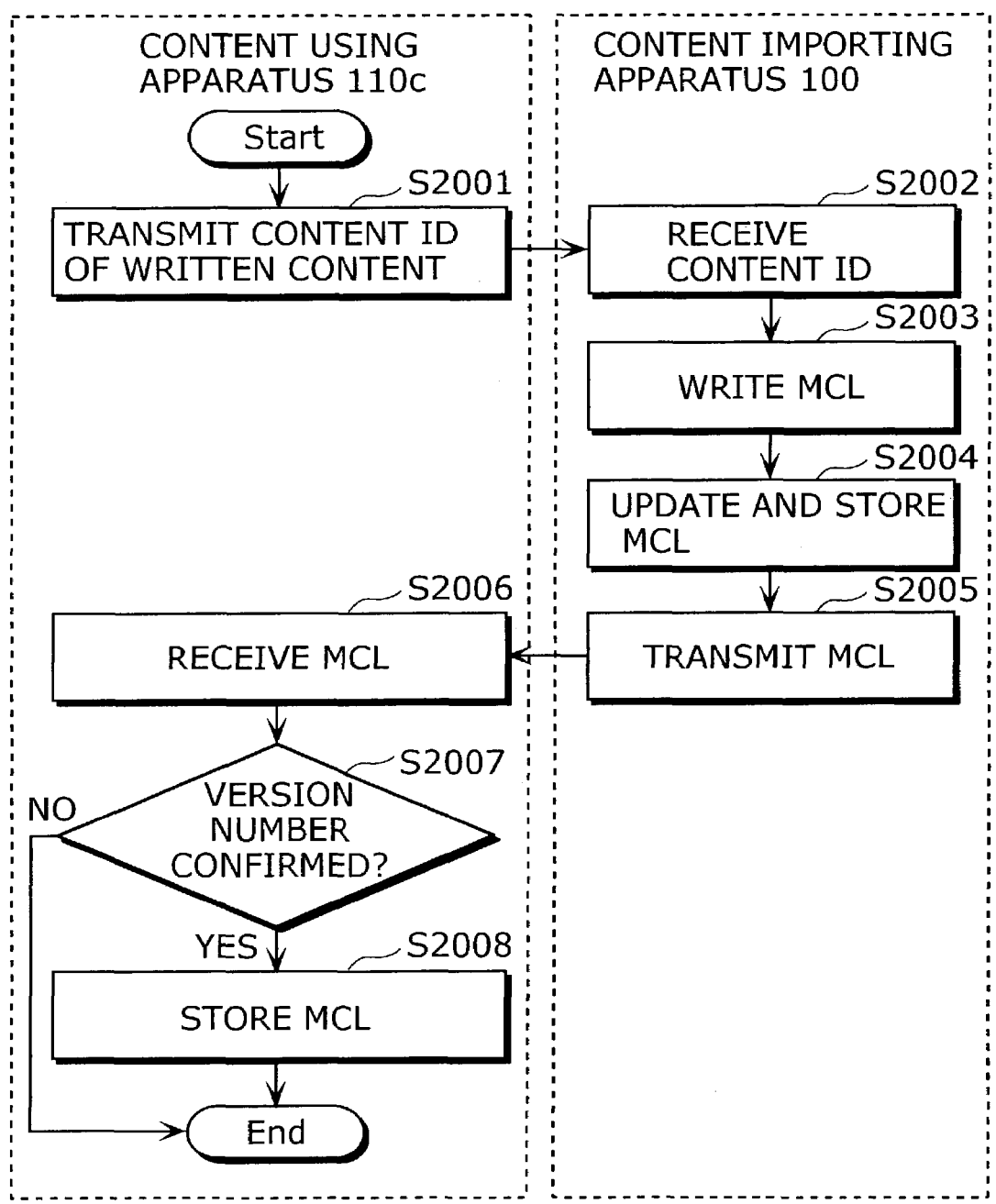
FIG. 23 is a flowchart showing the moved content list synchronization process performed between the content importing apparatus and the content using apparatus according to the fourth embodiment.

The following describes, with reference to the flowcharts in FIGS. 22 and 23, the processing that synchronizes the MCL between the content importing apparatus 100 and the content using apparatus 110c in the content using system 4 constructed as described above. It should be noted that the processing performed when a content is imported by the content importing apparatus 100 is the same as the operation shown in FIG. 18 and described in the third embodiment, and so a repeated description of such is omitted here.

FIG. 22 is a flowchart showing the content writing process of the content using apparatus 110c.

The separating unit 111 separates the content and the ECM from the transport stream received from the content importing apparatus 100. The separating unit 111 also separates the PMT, obtains the content ID from the content_id_descriptor of the descriptor part of the PMT, and notifies the content key information decrypting unit 112 (step S1901).

The content key information decrypting unit 112 transfers the content ID obtained from the separating unit 111 to the moved content list managing unit 1803, and the moved content list managing unit 1803 reads the MCL from the moved content list storing unit 1804 (step S1902). At this point, if no MCL is stored in the moved content list storing unit 1804, the moved content list managing unit 1803 generates an MCL.

The moved content list managing unit 1803 searches the MCL to judge whether or not the content ID received from the content key information decrypting unit 112 is present (step S1903).

When the judgment in step S1903 is "NO", which is to say, when the content ID is not present in the MCL, the moved content list managing unit 1803 temporarily stores the content ID for transmission to the content importing apparatus 100 (step S1904).

The content key information decrypting unit 112 receives TS packets for the ECM from the separating unit 111, reconstructs the ECM section, and obtains the re-encrypted ECM. The content key information decrypting unit 112 takes an XOR for the network key and the content ID, and decrypts the encrypted part of the ECM by using the result of the XOR (step S1905).

The content key information decrypting unit 112 extracts the content key from the ECM, transfers the content key to the content decrypting unit 116, and also instructs the content output control unit 115 to transfer the content in question to the content writing unit 119 (step S1906). Accordingly, the content output control unit 115 controls the content output selecting unit 117 to write the content.

The content decrypting unit 116 decrypts (descrambles) the TS packets obtained from the separating unit 111 by using the content key obtained from the content key information decrypting unit 112 (step S1907).

The content output selecting unit 117 transfers, based on the control of the content output control unit 115, the content to the content writing unit 119 in order to write the content (step S1908).

The content writing unit 119 writes the content onto a storage medium (step S1909). More specifically, the content writing unit 119 changes the format or encrypts the content, etc., by using a suitable method for the storage medium, such as a DVD-RAM or D-VHS,_and then writes the content onto the storage medium.

When the judgment in step S1903 is "YES", which is to say, the judgment result is that the content ID is present in the MCL, the information in the MCL relating to the content ID is used to confirm whether the writing is permitted or prohibited (step S1910). More specifically, since the number of writes, maximum writes per unit time, etc., are recorded for each content ID in the MCL, the moved content list managing unit 1803 refers to such information and confirms whether or not the write is permitted.

When the judgment in step S1910 is "YES", which is to say, the judgment result is that the write is permitted, the content ID is temporarily stored in the moved content list managing unit 1803 (step S1904). The processing in step S1904 onwards is the same as the processing described above, and so a repeated description of such has been omitted.

When the judgment in step S1910 is "NO", which is to say, the judgment result is that the write is prohibited, the content writing process is cancelled (step S1911).

FIG. 23 is a flowchart showing the process that transmits the content ID, which has been temporarily stored in the moved content list managing unit 1803 of the content using apparatus 110c as shown by step S1904 in FIG. 22, to the content importing apparatus 100 and so synchronizes the MCL between the content importing apparatus 100 and the content using apparatus 110c. It should be noted that, in FIG. 23, the content using apparatus 110c that has written the content represents a plurality of content using apparatuses 110c, with the other content using apparatuses 110c also performing a process that receives and synchronizes the MCL.

The content ID of the content that has been written, which is stored in the moved content list managing unit 1803 of the content using apparatus 110c, is transferred to the moved content list receiving unit 1802 and is transmitted via the network to the content importing apparatus 100 (step S2001).

The moved content list transmitting unit 1801 of the content importing apparatus 100 receives the content ID (step S2002) and transfers the content ID to the moved content list managing unit 1401.

The moved content list managing unit 1401 reads the MCL in the moved content list storing unit 1402 (step S2003), adds the received content ID to the MCL or updates the entry for this content ID, and updates the MCL in the moved content list storing unit 1402 (step S2004). At this point, the version number of the MCL is updated. The moved content list managing unit 1401 transfers the updated MCL to the moved content list transmitting unit 1801.

The moved content list transmitting unit 1801 transfers the updated MCL to the content using apparatuses 110c (step S2005). As one example, the moved content list transmitting unit 1801 may broadcast the MCL to every content using apparatus 110c.

The moved content list receiving unit 1802 of the content using apparatus 110c receives the updated MCL (step S2006) and transfers the received MCL to the moved content list managing unit 1803.

The moved content list managing unit 1803 refers to the version number of the received MCL and compares this with the version number of the stored MCL (step S2007).

When the judgment in step S2007 is "YES", which is to say, the received MCL is a newer version, the moved content list managing unit 1803 replaces the MCL in the moved content list storing unit 1804 with the received MCL (step S2008). It should be noted that when no MCL is stored in the moved content list storing unit 1804, the moved content list managing unit 1803 unconditionally writes the received MCL into the moved content list storing unit 1804.

When the judgment in step S2007 is "NO", which is to say, the received MCL is not a newer version, the moved content list managing unit 1803 discards the received MCL.

In this way, in the present content using system 4, a content ID is assigned to a content that has been bound to the network, and at the same time, the content ID is registered in the MCL that is managed in the content importing apparatus 100. This MCL is transmitted to the content using apparatus 110c, and when a content is to be written, the MCL that is stored in each content using apparatus 110c is used to judge whether the write is permitted or prohibited, thereby imposing limitations on the writing of contents.

Fifth Embodiment

The following describes a fifth embodiment of the present invention with reference to the attached drawings.

Figure 24:
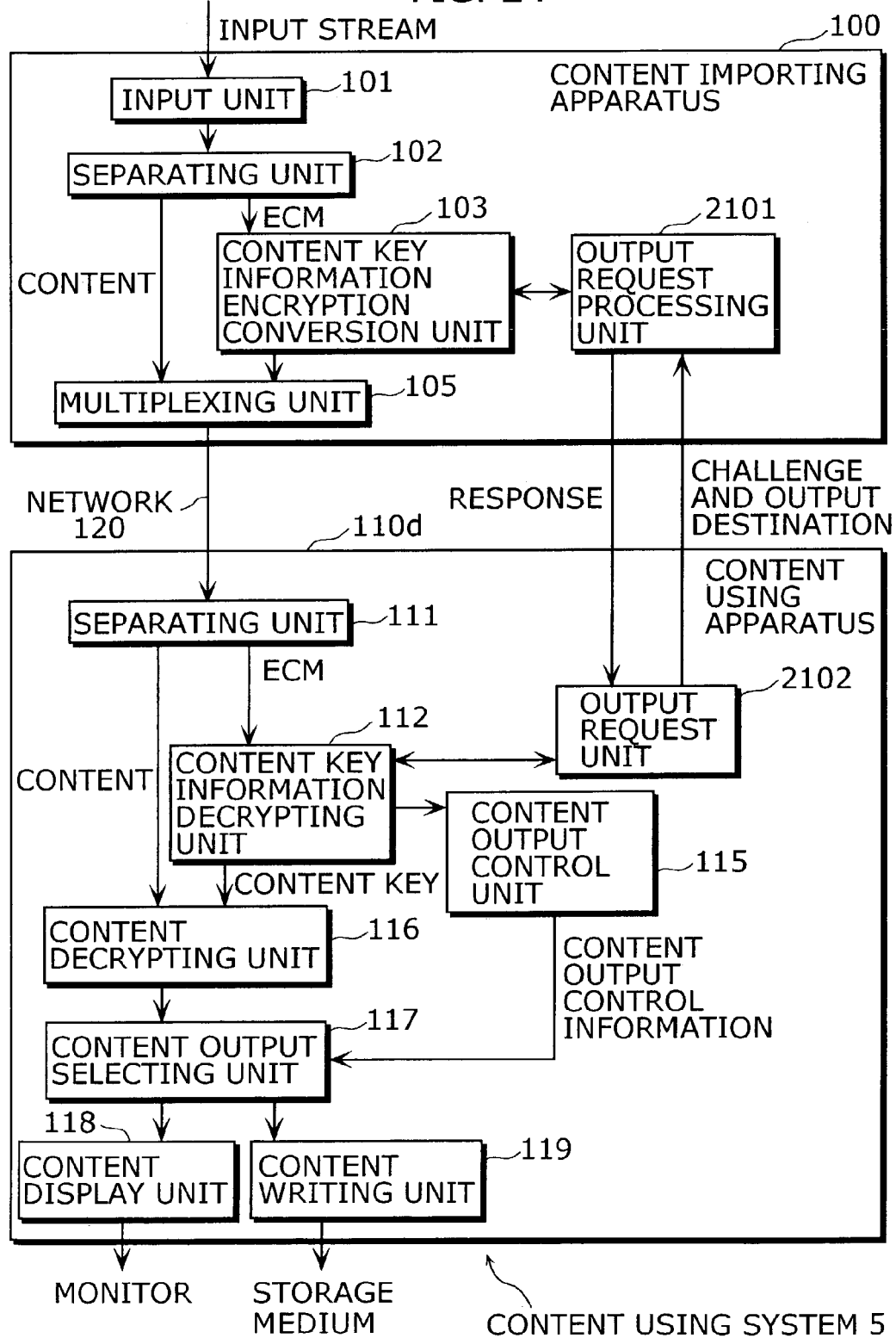
FIG. 24 is a functional block diagram showing the constructions of the content importing apparatus and the content using apparatus according to the fifth embodiment.

FIG. 24 is a block diagram showing the construction of a content using system 5 according to the fifth embodiment of the present invention. It should be noted that in FIG. 24 construction elements that are the same as in the content using system 1 of the first embodiment shown in FIG. 3 have already been described with reference to FIG. 3, so that such construction elements have been given the same reference numerals as in FIG. 3 and description of such has been omitted.

In the content using systems of the first to fourth embodiments of the present invention described above, when the content is imported by the content importing apparatus 100, the content key information is re-encrypted by using only an encryption key that has been shared in advance on the network, so that it is possible to use the content in real time and to use the content after first recording the content onto a storage unit, such as a hard disk drive, that is connected on the network. This means that when the content is written, limitations can be imposed on the writing by using the MCL.

On the other hand, in the content using system 5 shown in the fifth embodiment of the present invention, when the content importing apparatus 100 imports a content, secret information is generated, the content key information is re-encrypted by making use of this secret information, and when a content is written (reproduced), the content using apparatus 110d indicates the output destination and obtains the secret information from the content importing apparatus 100, and so becomes able to write (reproduce) the content. This is to say, a mode is provided for indicating the output destination of the content from the content using apparatus 110d to the content importing apparatus 100 and, in accordance with the output destination, then writing the content onto the storage medium in real time or reproducing the content. Here, when an output request has been received from the content using apparatus 110d, the content importing apparatus 100 confirms the write, thereby imposing a limitation over the writing of contents.

The content using system 5 shown in FIG. 24 is characterized as follows. The content importing apparatus 100 includes the input unit 101, the separating unit 102, the content key information encryption conversion unit 103, the multiplexing unit 105, and an output request processing unit 2101. The content using apparatus 110d includes the separating unit 111, the content key information decrypting unit 112, the content output control unit 115, the content decrypting unit 116, the content output selecting unit 117, the content display unit 118 and the content writing unit 119 as content outputting units, and an output request unit 2102. The content key information encryption conversion unit 103 of the content importing apparatus 100 generates secret information with an arbitrary timing and uses an encryption key (network key) that has been shared in advance on the network and the secret information to encrypt the content key information. The output request unit 2102 of the content using apparatus 110*d* transmits an output request to the content importing apparatus 100 as an output request for the writing or reproduction of a content, and the output request processing unit 2101 of the content importing apparatus 100 transmits the secret information as the request response. The output request unit 2102 of the content using apparatus 110*d* obtains the secret information from the request response. The content key information decrypting unit 112 decrypts the content key information by using the network key and the secret information, and decrypts the content by using the content key obtained from the content key information. The content output selecting unit 117 switches the output of the content in accordance with the output destination.

In the first embodiment of the present invention, the content key information encryption conversion unit 103 of the content importing apparatus 100 converts the encryption of the ECM by using the network key, but in the present embodiment, when a content is imported, secret information is generated at an arbitrary timing and the ECM is re-encrypted by using the network key and the secret information. As examples of the timing for generating the secret information, the secret information may be generated for each program (event) and/or for each content and when new secret information is generated, the previous secret information is deleted. In this way, by using a method for judging whether or not secret information is stored for only a period during which the secret information is valid, the content that is outputted can be identified.

The output request processing unit 2101 of the content importing apparatus 100 transmits, as the output request for a content from the content using apparatus 110*d*, the output destination for a content and a challenge that is used for authentication, generates a response from the challenge, and transmits the response and the secret information to the content using apparatus 110*d* as the request response.

The output request unit 2102 of the content using apparatus 110*d* transmits, to the content importing apparatus 100, an output destination in accordance with whether the content is to be written or to be reproduced and a challenge that is used for authentication. The output request unit 2102 receives the response and the secret information transmitted from the content importing apparatus 100 as the response to the output request, and authenticates the response. Only when the authentication succeeds does the output request unit 2102 perform processing that transfers the secret information to the content key information decrypting unit 112. It should be noted that the details of the challenge-response authentication are not described in this embodiment, although the authentication process may be performed by using the same method as the challenge-response that is used in CHAP (Challenge Handshake Authentication Protocol) or SSL (Secure Socket Layer).

The operation of the content using system 5 constructed as described above is described below using the flowcharts shown in FIGS. 25 and 26.

Figure 25:
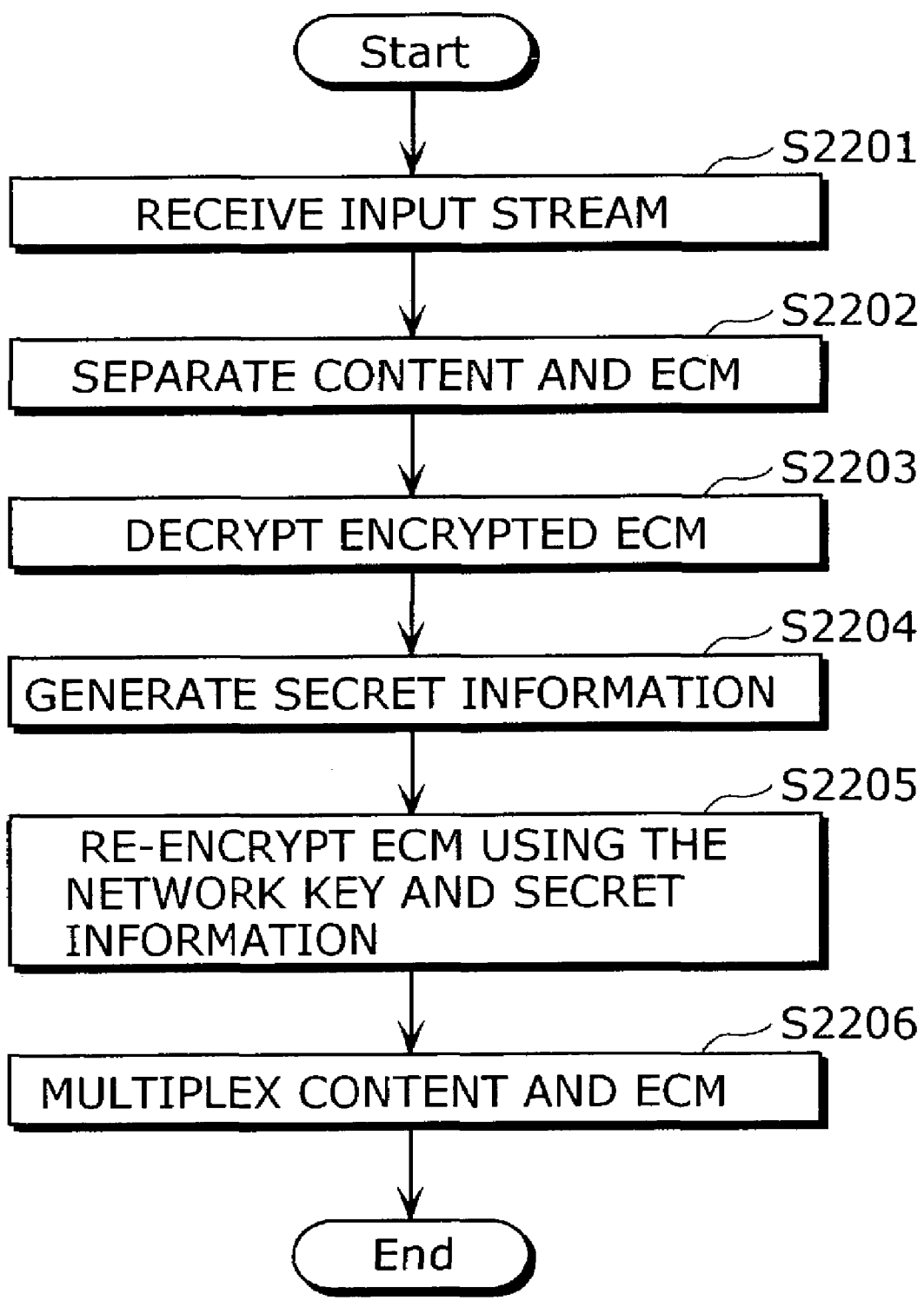
FIG. 25 is a flowchart showing the content importing process of the content importing apparatus according to the fifth embodiment.

FIG. 25 is a flowchart showing the processing when a content is imported by the content importing apparatus 100.

The input unit 101 receives a transport stream from the broadcast wave (step S2201).

The separating unit 102 receives the transport stream from the input unit 101, refers to the PIDs of the TS packets, and separates the TS packets of the content and the TS packets of the ECM (step S2202). To make it possible for the content key information encryption conversion unit 103 to identify an event, the separating unit 102 separates the EIT packets and transfers the EIT packets to the content key information encryption conversion unit 103.

The content key information encryption conversion unit 103 receives the TS packets of the ECM, reconstructs the ECM section, and decrypts the encrypted ECM by using the work key (step S2203). The content key information encryption conversion unit 103 also reconstructs the EIT from the received TS packets of the EIT and obtains the event information.

The content key information encryption conversion unit 103 generates secret information in event units (step S2204). More specifically, the content key information encryption conversion unit 103 generates, for each event, secret information of a fixed byte length by using a random number.

The content key information encryption conversion unit 103 uses the generated secret information and the network key to re-encrypt the ECM (step S2205). More specifically, the content key information encryption conversion unit 103 uses a certain encryption algorithm, such as AES (Advanced Encryption Standard), and the generated secret information to encrypt the content key part of the ECM. In addition, the content key information encryption conversion unit 103 encrypts the entire ECM by using the network key. The content key information encryption conversion unit 103 converts the re-encrypted ECM into TS packets and transfers the packets to the multiplexing unit 105.

The multiplexing unit 105 multiplexes TS packets of the content that have been received from the separating unit 102 with TS packets of the ECM, whose encryption has been converted, that have been received from the content key information encryption conversion unit 103 (step S2206).

In this way, the content importing apparatus 100 generates secret information and uses the network key and this secret information to convert the encryption of the ECM, which results in the content being processed so that the content cannot be used without first obtaining the secret information.

Figure 26:
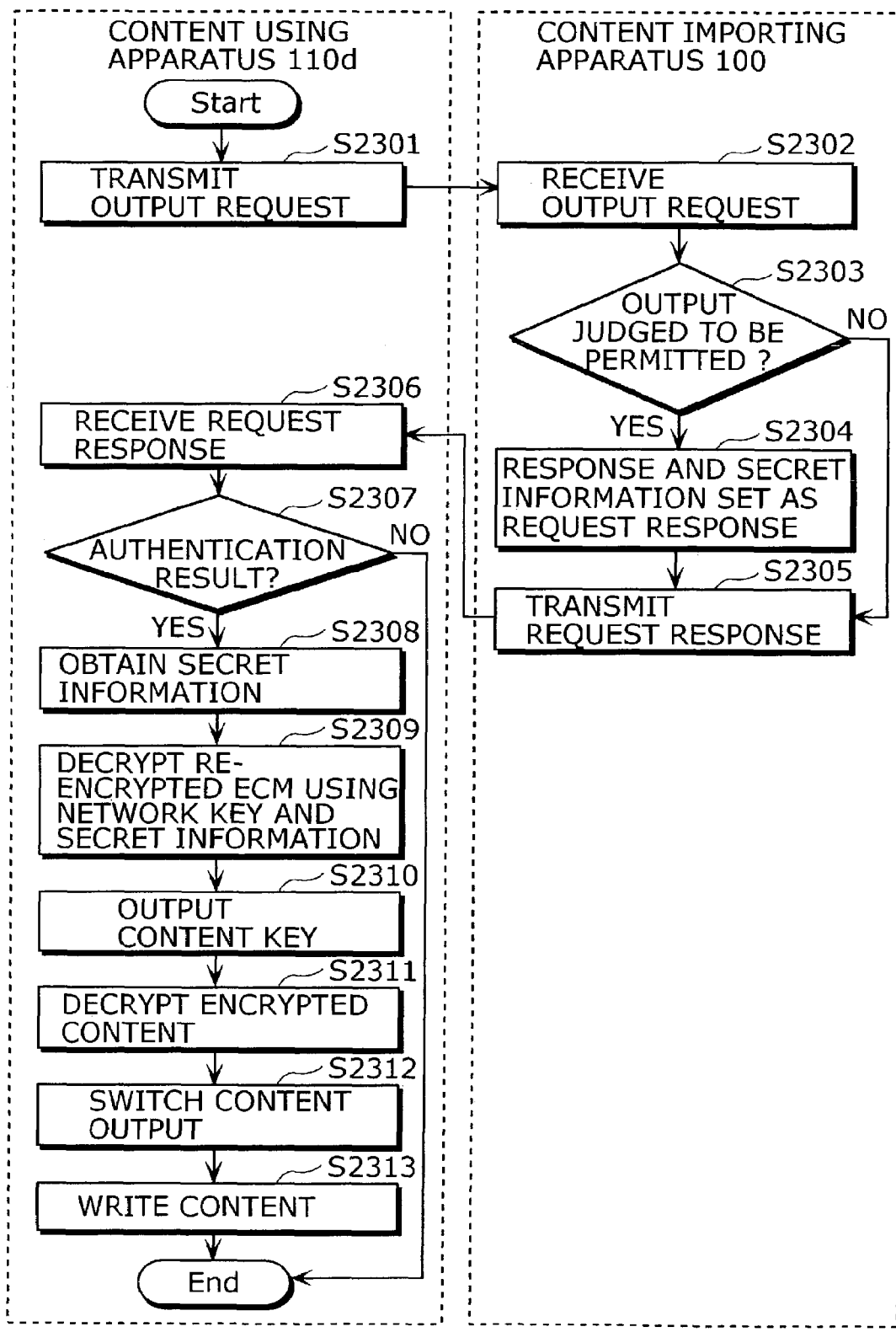
FIG. 26 is a flowchart showing the content writing process of the content using apparatus according to the fifth embodiment.

On the other hand, FIG. 26 is a flowchart showing the content writing process in the content using apparatus 110*d*.

When the output request unit 2102 of the content using apparatus 110 directly writes a content that is broadcast in real time, the output request unit 2102 generates a challenge (such as a random number) for performing an authentication process with the content importing apparatus 100, and transmits the challenge data and an output destination of the content (which indicates the content writing unit 119, etc.) to the content importing apparatus 100 as an output request (step S2301).

The output request processing unit 2101 of the content importing apparatus 100 receives the challenge and the output destination as the output request from the content using apparatus 110*d* (step S2302).

The output request processing unit 2101 judges whether the outputting of the content is permitted or prohibited (step S2303). More specifically, the output request processing unit 2101 confirms the output destination (the write destination) in the output request, compares the output destination with the limitations on the write destination that are defined for the system or by copy control information written in the broadcast wave, and determines whether the write is permitted or prohibited. When a challenge/response procedure is performed with a certain content using apparatus 110*d*, a limitation can be imposed on the writing of a content by not having the output request processing unit 2101 receive a challenge from other content using apparatuses 110*d* on the network or by receiving challenges from the content using apparatuses 110d only until a predetermined number of challenges has been reached.

When the judgment in step S2303 is "YES", which is to say, when the output request processing unit 2101 has judged that the outputting is permitted, the output request processing unit 2101 generates a response from the challenge and sets the response and the secret information in a message as a request response (step S2304).

When the judgment in step S2303 is "NO", which is to say, when the output request processing unit 2101 has judged that the outputting is prohibited, the output request processing unit 2101 generates an error message showing that the outputting is prohibited and sets this in a message as a request response.

The output request processing unit 2101 transmits the request response to the content using apparatus 110d (step S2305).

The output request unit 2102 of the content using apparatus 110d receives the request response (step S2306) and authenticates the response (step S2307).

When the judgment in step S2307 is "YES", which is to say, when the authentication process has succeeded, the output request unit 2102 obtains the secret information and transfers the secret information to the content key information decrypting unit 112 (step S2308).

When the judgment in step S2307 is "NO", which is to say, when the authentication process has failed, the output request unit 2102 does not obtain the secret information and the content writing process is terminated.

The content key information decrypting unit 112 decrypts the re-encrypted ECM by using the network key and also uses the secret information to decrypt the encrypted part of the content key (step S2309). The content key information decrypting unit 112 also indicates the write destination and the write path, etc., for the content to the content output control unit 115.

The content key information decrypting unit 112 transfers the decrypted content key to the content decrypting unit 116 (step S2310).

The content decrypting unit 116 decrypts the encrypted content received from the separating unit 111 by using the content key received from the content key information decrypting unit 112 (step S2311).

The content output selecting unit 117 selects to output the content to the content writing unit 119 in accordance with the content output control information (the write destination and the write path, etc., for the content) received from the content output control unit 115 (step S2312).

The content writing unit 119 outputs the content to the storage medium (step S2313).

In this way, the present content using system 5 is provided with a mode for outputting a content in real time to a storage medium (or reproducing the content) and by re-encrypting the content key information by using secret information, which is generated when the content is imported, and a network key, where only content using apparatuses 110d that have been able to obtain the secret information can use the content. This is to say, if the content importing apparatus 100 performs control so as to transfer the secret information to only a limited number of content using apparatuses 110d, there is no need to store or manage the MCL, which has the advantages of high security and of making it possible to simplify the construction. As one example, if copying is only allowed once for a content (such as when the copy control information is "NETWORK COPY"), when the content is imported, it is possible to impose a limitation by having the content importing apparatus 100 refer to the copy control information, convert the encryption of the content key information in this mode, and transfer the secret information to only one content using apparatus 110d, so that only one copy can be generated from the network.

It should be noted that while the present embodiment describes an example where the content importing apparatus 100 encrypts the content key information by using the secret information, which is generated when the content is imported, and the network key, which is an encryption key that is shared on the network in advance, although it is provided that the encryption key for encrypting the content key information is shared by at least the content importing apparatus 100 and the content using apparatus 110, the present embodiment is not limited to the above example.

Sixth Embodiment

The following describes a sixth embodiment of the present invention with reference to the attached drawings.

Figure 27:
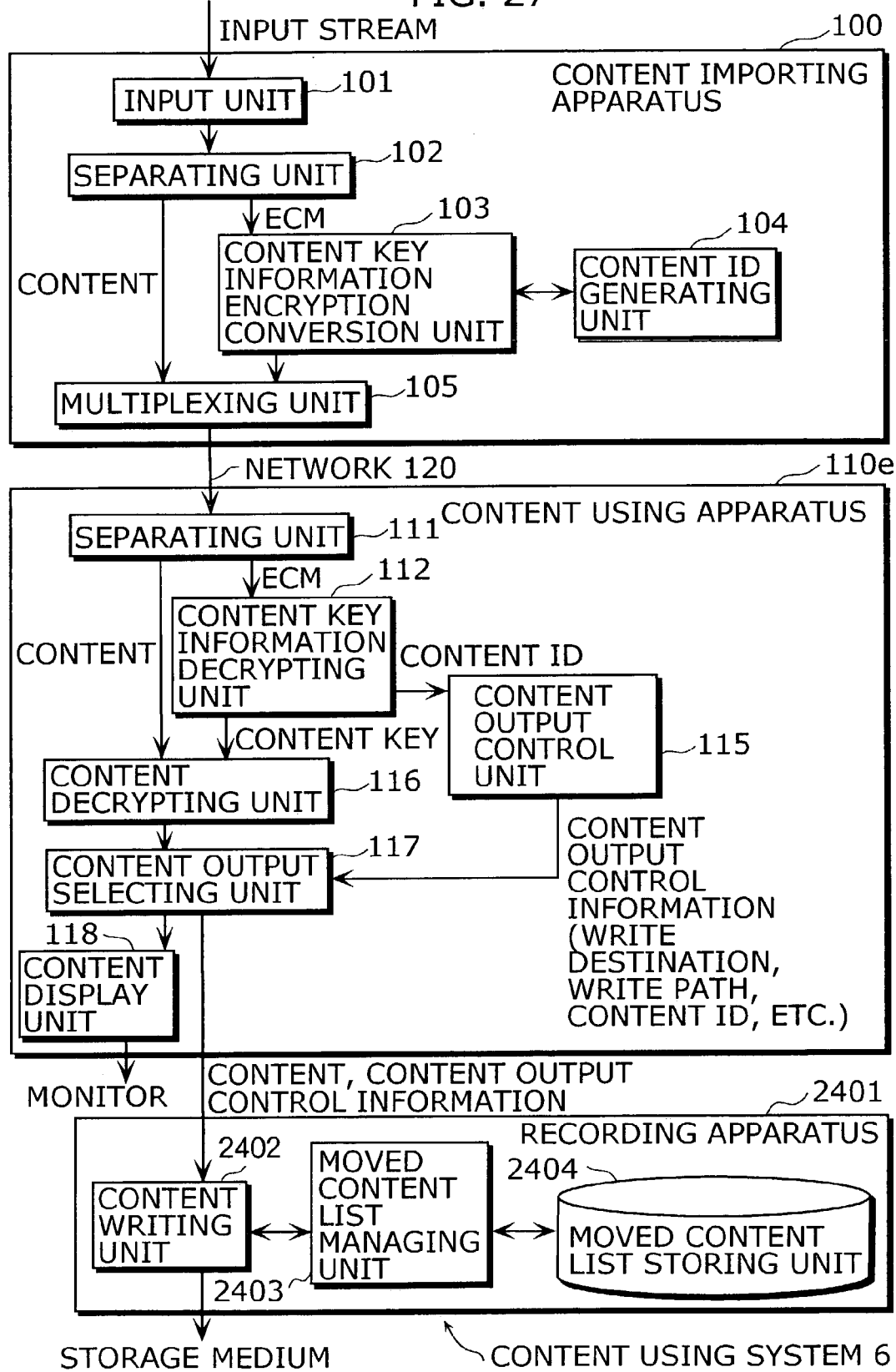
FIG. 27 is a functional block diagram showing the constructions of the content importing apparatus, the content using apparatus, and the recording apparatus according to the sixth embodiment.

FIG. 27 is a block diagram showing the construction of a content using system 6 according to the sixth embodiment of the present invention. It should be noted that in FIG. 27 construction elements that are the same as in the content using system 1 of the first embodiment shown in FIG. 3 have already been described with reference to FIG. 3, so that such construction elements have been given the same reference numerals as in FIG. 3 and description of such has been omitted.

Compared to the content using system 1 of the first embodiment of the present invention, the content using system 6 shown in FIG. 27 is characterized as follows. The content using system 6 further includes a recording apparatus 2401 for recording a content onto a recording medium. While the construction of the content importing apparatus 100 is the same as that of the content importing apparatus 100 in the first embodiment of the present invention, the content using apparatus 110e does not include the moved content list managing unit 113, the moved content list storing unit 114 and the content writing unit 119. The recording apparatus 2401 includes a content writing unit 2402, a moved content list managing unit 2403, and a moved content list storing unit 2404. The recording apparatus 2401 manages the MCL, and when a content and a content ID received from the content using apparatus 110e are to be written on a storage medium, the recording apparatus 2401 uses the MCL to judge whether the writing of the content is permitted or prohibited and controls the writing of the content based on the result of this judgment.

The recording apparatus 2401 can be an apparatus such as a DVD-RAM recorder or an SD CARD writer/reader that writes a content onto a storage medium.

The content writing unit 2402 performs the processing required to write a content onto a storage medium and writes the content onto the storage medium.

The moved content list storing unit 2404 is the part that stores the MCL and is realized by a hard disk drive or the like.

The moved content list managing unit 2403 manages the MCL stored in the moved content list storing unit 2404. More specifically, the moved content list managing unit 2403 performs a read/write process for the MCL that reads the MCL from the moved content list storing unit 2404, updates the MCL, and writes the MCL back into the moved content list storing unit 2404. The moved content list managing unit 2403 also receives a content ID of a content to be written onto a storage medium from the content writing unit 2402, and uses the MCL to judge whether to allow the writing of the MCL onto the storage medium.

Figure 28:
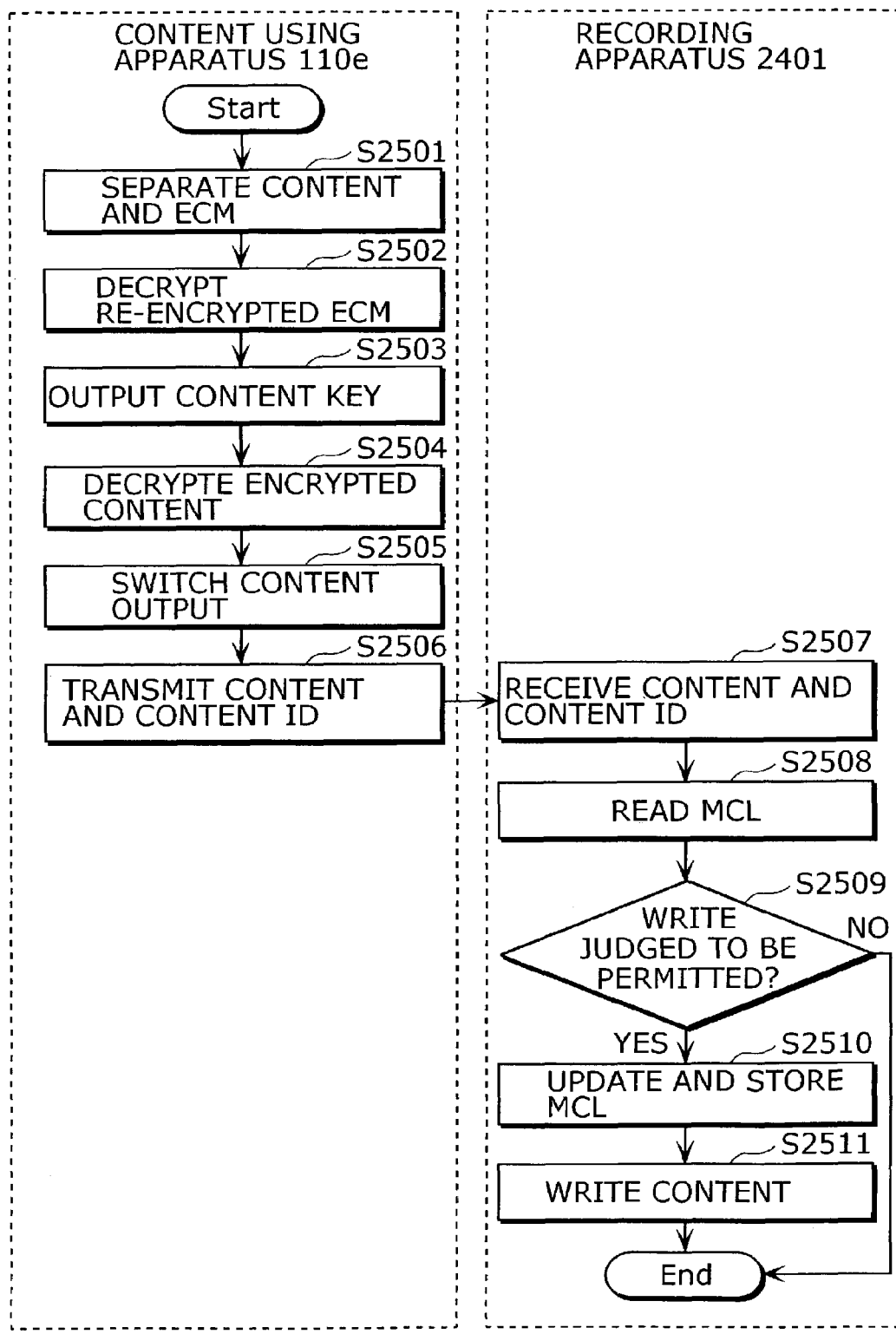
FIG. 28 is a flowchart showing the content write process of the content using apparatus and the recording apparatus according to the sixth embodiment.

The following describes, with reference to the flowchart shown in FIG. 28, the operation of the content using system 6 constructed as described above.

It should be noted that the content importing process performed by the content importing apparatus 100 is the same as in the first embodiment of the present invention and has already been described, so that a repeated description of such is omitted here.

FIG. 28 is a flowchart showing the content writing process of the content using apparatus 110e and the recording apparatus 2401.

The separating unit 111 separates the content and the ECM from the transport stream received from the content importing apparatus 100 (step S2501).

The content key information decrypting unit 112 receives the TS packets of the ECM from the separating unit 111, reconstructs the ECM section, and so obtains the re-encrypted ECM. The content key information decrypting unit 112 decrypts the re-encrypted part of the ECM by using a network key that has been obtained in advance (step S2502).

The content key information decrypting unit 112 extracts the content key from the ECM and transfers the content key to the content decrypting unit 116 (step S2503). The content key information decrypting unit 112 also transmits the information such as the write destination and the write path to the content output control unit 115 so that the content output control unit 115 can control the content output selecting unit 117 to output to the recording apparatus 2401. In addition, the recording apparatus 2401 reads, from the ECM, the content ID that is used to judge whether the writing of a content is permitted or prohibited and transfers the content ID to the content output control unit 115. The content output control unit 115 transfers the content ID, the write destination, and the write path to the content output selecting unit 117 as content output control information.

The content decrypting unit 116 decrypts (descrambles) the TS packets obtained from the separating unit 111 by using the content key obtained from the content key information decrypting unit 112 (step S2504).

The content output selecting unit 117 switches to outputting to the recording apparatus 2401 based on the content output control information from the content output control unit 115 (step S2505) and transmits the content and the content output control information (step S2506).

The content writing unit 2402 of the recording apparatus 2401 receives the content and the content output control information from the content using apparatus 110e (step S2507). The received content output control information is transferred to the moved content list managing unit 2403.

The moved content list managing unit 2403 reads the MCL from the moved content list storing unit 2404 (step S2508) and judges whether the write is prohibited or permitted (step S2509). This judgment as to whether the write is prohibited or permitted is performed by using the same method as described in the first embodiment, and so a repeated description of such is omitted here.

When the judgment in step S2509 is "YES", which is to say, when the write has been judged to be permitted, the MCL is updated and is stored in the moved content list storing unit 2404 (step S2510). The content writing unit 2402 is also instructed to commence the content writing process.

The content writing unit 2402 writes the content onto the storage medium (step S2511).

It should be noted that when the judgment in step S2509 is "NO", which is to say, when the write has been judged to be prohibited, the content writing process is terminated.

In this way, in the present content using system 6, the MCL is managed in the recording apparatus 2401 and the MCL is used when writing a content to judge whether the write is permitted or prohibited, so that limitations can be imposed on the writing of contents by each recorder.

It should be noted that if there is a generation unit that uniformly increases or uniformly decreases the content ID, the generation method of the content ID is not limited to the methods described in the first to fourth and sixth embodiments of the present invention. The content ID may be generated by using a unique random number.

The content IDs may be assigned in scramble units for the contents. Alternatively, content IDs may be assigned in units in which button operations (user actions) for reproduction and recording, etc., are made by users. As specific examples, such a unit may be from when the user indicates the start of recording until when the user indicates the end of recording or from the selection of a channel by the user until the selection of another channel.

The first to fourth and sixth embodiments of the present invention show examples where content IDs are generated by the content ID generating unit 104 of the content importing apparatus 100, although it is possible to omit the content ID generating unit 104 and to use information that is assigned in advance to input data (such as data (the EIT, etc.) that is distributed together with the content) as the content IDs. More specifically, in the case of a digital broadcast, the service_id and the event_id that are set in the EIT may be used without amendment as the content IDs. Alternatively, when content IDs have been assigned to contents on the transmission side, such content IDs may be used.

The embodiments describe examples where a content is associated with the content key information using the multiplexing unit 105, although such associating is not limited to this method. Instead of separating and multiplexing, the content and content key information may be associated by any method.

In the above embodiments, between the content importing apparatus 100 and the content using apparatus 110, between a plurality of content using apparatuses 110, and between the content using apparatus 110 and the recording apparatus 2401, the content ID is transmitted and received in order to confirm the MCL, synchronization information for the MCL is transmitted and received, the content is transmitted and received, and content output control information is transmitted and received; however, encryption may be performed for such communication to stop such data from being replaced or being tampered with.

At least the content key information encryption conversion unit 103 and the content ID generating unit 104 in the content importing apparatus 100, and the content key information decrypting unit 112, the moved content list managing unit 113, the moved content list storing unit 114 and the content output control unit 115 of the content using apparatus 110 are parts that perform processing which relates to security, so that these units may be realized by modules, such as security modules, with tamper-free constructions.

Also, the first and fourth embodiments of the present invention show an example where the content using apparatus 110 includes a content display unit 118 and a content writing unit 119, although the content using apparatus 110 does not need to include both of these units, and the content using apparatus 110 may include only a content display unit 118 or the content using apparatus 110 may include only a content writing unit 119. In this case, one or both of the content output control unit 115 and the content output selecting unit 117 can also be omitted.

The first to sixth embodiments of the present invention are examples where an MPEG content, which has been multiplexed according to MPEG-2 Systems, is imported from a digital broadcast, although this is not a limitation for the present invention and it should be obvious that the present invention can be applied to a case where contents of any format are imported from a communication medium, such as the Internet, and/or a recording medium, such as a packaged medium.

In the above embodiments, examples include, for outputting a content, a display unit for reproducing and displaying a content on a monitor and a writing unit for writing on a storage medium are described. It is to be understood, however, though the present invention is not limited to these examples and the content may be outputted to a digital bus such as an IEEE 1394 bus. Here, it is possible to use a construction where it is judged whether the outputting of the content to the digital bus is permitted or prohibited in the same way as for the writing units in the above embodiments.

In addition, in the content using apparatuses in each of the above embodiments, the content writing units may have a construction where in addition to the writing of a content in a state where the content is not bound to the network, the user may be able to select a writing of the content in a bound state.

Also, each of the above embodiments may be constructed so that when the size of the MCL reaches the maximum size and content IDs can no longer be added, the content ID to be deleted from the MCL is determined according to a random number.

Additionally, in each of the above embodiments, the maximum number of writes, the write destination, and the write path can be set as the write conditions in the ECM, but it is possible to use a construction where information that shows whether writing is permitted or prohibited is set somewhere aside from the ECM in the transport stream.

Finally, the content importing apparatuses in each of the above embodiments may be physically integrated with any of the content using apparatuses.

INDUSTRIAL APPLICABILITY

The content using system of the present invention is composed of a content importing apparatus that is connected to a network and at least one content using apparatus. The content importing apparatus includes a content ID issuing unit that issues a content ID, and a content key information encryption converting unit that converts the encryption of content key information by using a network key that is shared in advance on the network. The content using apparatus includes a content key information decrypting unit that decrypts the content key information, whose encryption has been converted, by using the network key, a moved content list storing unit for storing a moved content list (MCL) in which the content IDs of contents that have been written onto a storage medium are written, and a moved content list managing unit that judges whether the writing of a content is permitted or prohibited based on the MCL. The present invention is utilized in a content using system, a content using method, a content using apparatus, and a content using program that write a content in accordance with the above judgment of whether the writing is permitted or prohibited.

The invention claimed is:

1. A content using system in which a content is used on a network to which a plurality of apparatuses are connected, said system comprising:
    a binding unit that is provided in at least one of the plurality of apparatuses and is operable to bind the content to the network by putting the content in a state where only the apparatuses on the network can use the content;
    an identification information issuing unit that is provided in at least one of the plurality of apparatuses and is operable to issue identification information uniquely identifying a content to be written onto a storage medium and corresponding to the content that has been bound by said binding unit;
    a bind removing unit that is provided in at least one of the plurality of apparatuses and is operable to put the content that has been bound by said binding unit in an unbound state;
    a writing unit that is provided in at least one of the plurality of apparatuses and is operable to write the content that has been put in the unbound state by said bind removing unit onto a storage medium;
    a table unit that is provided in at least one of the plurality of apparatuses and is operable to store a table indicating the identification information uniquely identifying the content written by said writing unit; and
    a suppressing unit that is provided in at least one of the plurality of apparatuses and is operable to obtain the identification information uniquely identifying the content to be written by said writing unit and to suppress writing of the content by said writing unit based on a content of the table.

2. A content using system according to claim 1, wherein said suppressing unit is operable to obtain the indentification information uniquely identifying the content to be written by said writing unit, to add, if the obtained identification information has not already been recorded in the table, the identification information to the table without suppressing the writing of the content by said writing unit, and to suppress the writing of the content by said writing unit if the obtained identification information is present in the table.

3. A content using system according to claim 1, wherein said suppressing unit is operable to obtain the identification information uniquely identifying the content to be written by said writing unit, to add, if the obtained identification information is not present in the table, the obtained identification information to the table and "1" as a number of writes by said writing unit, and to suppress the writing by said writing unit if the obtained identification information is present in the table and the number of writes has reached a predetermined maximum number.

4. A content using system according to claim 3, wherein said binding unit is operable to bind the content to the network by encrypting a content key for decrypting the content by using a network key that is shared in advance with the plurality of apparatuses.

5. A content using system according to claim 4, wherein:
    the plurality of apparatuses include one content importing apparatus and at least one content using apparatus;
    the content importing apparatus includes said binding unit and said identification information issuing unit; and
    each of the content using apparatuses includes said table unit, said bind removing unit, said writing unit, and said suppressing unit.

6. A content using system according to claim 5, wherein the content using apparatuses further include:
- a notifying unit operable to notify, when a write has been performed by said writing unit, other content using apparatuses of at least the identification information; and
- an updating unit operable to update a table stored in said table unit when a notification is received from another content using apparatus.

7. A content using system according to claim 4, wherein:
the plurality of apparatuses include one content importing apparatus and at least one content using apparatus;
the content importing apparatus includes said binding unit, said identification information issuing unit, said table unit and said suppressing unit; and
each of the content using apparatuses includes said bind removing unit and said writing unit.

8. A content using system according to claim 4,
the plurality of apparatuses include one content importing apparatus and at least one content using apparatus;
the content importing apparatus includes said binding unit, said identification information issuing unit, and said table unit; and
each of the content using apparatuses includes said bind removing unit, said writing unit, and said suppressing unit.

9. A content using system according to claim 8, wherein:
each content using apparatus further includes a second table unit operable to store a copy of the table by obtaining a content of the table stored in said table unit of the content importing apparatus; and
said suppressing unit is operable to suppress the writing of the content by said writing unit based on the copy of the table stored in said second table unit.

10. A content using system according to claim 4, wherein said identification information issuing unit is one of (a) to (e):
- (a) a unit operable to generate and issue the identification information by using a counter;
- (b) a unit operable to generate and issue the identification information by uniformly incrementing or uniformly decrementing;
- (c) a unit operable to generate and issue the identification information by using a random value that generates a unique value;
- (d) a unit operable to generate and issue the identification information based on data distributed together with the content; and
- (e) a unit operable to obtain and issue the identification information from data distributed together with the content.

11. A content using system according to claim 4, wherein said identification information issuing unit is operable to generate identification information that is associated with an ID for identifying the content importing apparatus.

12. A content using system according to claim 4, wherein said identification information issuing unit is operable to generate the identification information for each content that corresponds to a broadcast program.

13. A content using system according to claim 4, wherein:
the table includes information indicating a write destination of a content for each identification information; and
said suppressing unit is operable to suppress the writing by said writing unit when the write destination indicated by the information included in the table differs from a write destination into which said writing unit is to write the content.

14. A content using system according to claim 4, wherein:
the table includes information indicating a write path of a content for each identification information; and
said suppressing unit is operable to suppress the writing by said writing unit when the write path indicated by the information included in the table differs from a write path in which said writing unit is to write the content.

15. A content using system according to claim 4, wherein:
the table includes information indicating a permitted number of writes per unit time for the content; and
said suppressing unit is operable to suppress the writing by said writing unit when a number of writes of a content per unit time by said writing unit exceeds the permitted number of writes per unit time.

16. A content using system according to claim 4, wherein:
the table includes information indicating a time interval from a writing of a content until a next permitted writing of the content; and
said suppressing unit is operable to suppress the writing by said writing unit when an interval for writes by said writing unit is shorter than the time interval.

17. A content using system according to claim 4, wherein said table unit is operable to securely manage a hash value of the table.

18. A content using system according to claim 4, wherein said table unit is operable to store a threshold value for deleting identification information that have been recorded in the table and delete, when a number of identification information that have been recorded in the table has reached the threshold value, at least one identification information from the table.

19. A content using system according to claim 18, wherein:
the table further includes time and date information indicating a time and date at which each identification information was registered; and
when the number of identification information that have been recorded in the table has reached the threshold value, said table unit is operable to determine identification information to be deleted based on the time and date information.

20. A content using system according to claim 18, wherein:
the table further includes access information for contents; and
when the number of identification information that have been recorded in the table has reached the threshold value, said table unit is operable to determine identification information to be deleted based on the access information.

21. A content using system according to claim 18, wherein said table unit is operable to generate a random number when the number of identification information that have been recorded in the table has reached the threshold value and determine identification information to be deleted based on the generated random number.

22. A content using system including a content importing apparatus and at least one content using apparatus that share a network key, where a content is bound to a network by encrypting content key information, which includes a content key required to decrypt the content, by using the network key,
wherein said content importing apparatus includes:

an obtaining unit operable to obtain a content and encrypted content key information, which includes the content key for the content, from outside said content importing apparatus;

an identification information generating unit operable to generate identification information for identifying the content obtained by said obtaining unit; and an encryption converting unit operable to convert encryption by decrypting the encrypted content key information obtained by said obtaining unit, adding the identification information to the decrypted content key information, and re-encrypting the content key information by using the network key; and wherein each content using apparatus includes:

a first decrypting unit operable to decrypt the re-encrypted content key information by using the network key;

a second decrypting unit operable to decrypt the content by using the content key in the content key information decrypted by said first decrypting unit;

a writing unit operable to write the content decrypted by said second decrypting unit onto a storage medium;

a table storing unit operable to store a table in which the identification information included in the content key information decrypted by said first decrypting unit is associated with a number of times the content corresponding to the identification information has been written by said writing unit; and a suppressing unit operable to obtain the identification information of the content to be written by said writing unit, to refer, in the table, to the number of times the content corresponding to the identification information has been written, and to suppress writing of the content by said writing unit when the number of times has reached a predetermined maximum number of times.

23. A content using system according to claim 22, wherein:

at least one content using apparatus further includes a reproducing unit operable to reproduce the content that has been decrypted by said second decrypting unit; and said suppressing unit is operable to obtain the identification information of the content to be written by said writing unit, to refer, in the table, to the number of times the content corresponding to the identification information has been written, and to suppress reproduction by said reproduction unit when the number of times has reached a predetermined maximum number of times.

24. A content using system according to claim 22, wherein:

each content using apparatus further includes a table synchronizing unit operable to synchronize the table with tables of other content using apparatuses; and when the table is updated, said table synchronizing unit is operable to transmit synchronization information including at least the identification information to table synchronizing units of other content using apparatuses, and when synchronization information is received from a table synchronizing unit in another content using apparatus, said table synchronizing unit is operable to update the table in said table storing unit.

25. A content using system including a content importing apparatus and at least one content using apparatus that share a network key, where a content is bound to a network by encrypting content key information, which includes a content key required to decrypt the content, by using the network key, wherein said content importing apparatus includes:

an obtaining unit operable to obtain a content and encrypted content key information, which includes a content key for the content, from outside said content importing apparatus;

an identification information generating unit operable to generate identification information for identifying the content obtained by said obtaining unit;

an encryption converting unit operable to convert encryption by decrypting the encrypted content key information obtained by said obtaining unit, adding the identification information to the decrypted content key information, and re-encrypting the content key information by using the network key;

a table storing unit operable to store a table that includes the identification information of a content that has been written onto a storage medium by a content using apparatus;

a table managing unit operable to use, when a write permission judgment request has been received from a content using apparatus, the table to judge whether or not writing of a content is permitted and to update the table based on a judgment result; and an identification information receiving unit operable to receive the write permission judgment request from the content using apparatus and to transmit the judgment result obtained from said table managing unit; and wherein said content using apparatuses each include:

a first decrypting unit operable to decrypt the re-encrypted content key information by using the network key;

an identification information transmitting unit operable to transmit to the content importing apparatus a write permission judgment request including the identification information included in the decrypted content key information and to receive the judgment result;

a second decrypting unit operable to decrypt the content by using the content key included in the content key information decrypted by said first decrypting unit only when the received judgment result indicates that the writing is permitted; and a writing unit operable to write the content decrypted by said second decrypting unit onto a storage medium.

26. A content using system including a content importing apparatus and at least one content using apparatus that share a network key, where a content is bound to the network by encrypting content key information, which includes a content key required to decrypt the content, by using the network key, wherein said content importing apparatus includes:

an obtaining unit operable to obtain a content and encrypted content key information, which includes a content key for the content, from outside said content importing apparatus;

an identification information generating unit operable to generate identification information for identifying the content obtained by said obtaining unit;

an encryption converting unit operable to convert encryption by decrypting the encrypted content key information obtained by said obtaining unit, adding the identification information to the decrypted content key information, and re-encrypting the content key information by using the network key;

a first table storing unit operable to store a table that includes the identification information of a content that has been written onto a storage medium by a content using apparatus;

a table managing unit operable to use, when a write permission judgment request has been received from a content using apparatus, the table to judge whether or not writing of a content is permitted and to update the table based on a judgment result; and a table transmitting unit operable to receive synchronization information from a content using apparatus and to transmit the table to the content using apparatus; and wherein each content using apparatus includes:
a first decrypting unit operable to decrypt the re-encrypted content key information by using an encryption key that has been shared in advance on the network and to output the content key;

a table receiving unit operable to transmit synchronization information for the table that includes at least identification information to said content importing apparatus and to receive the table;

a second table storing unit operable to store the table;

a table managing unit operable to update the table stored in said second table storing unit by using the table received from said content importing apparatus and to judge whether or not writing of a content is permitted by using the table;

a second decrypting unit operable to decrypt the encrypted content by using the content key only when a judgment result of said table managing unit indicates that writing is permitted; and a writing unit operable to write the content decrypted by said second decrypting unit onto a storage medium.

27. A content using system including a content importing apparatus and at least one content using apparatus that share a network key, and a content writing apparatus that is connected to at least one of said at least one content using apparatus and writes a content onto a storage medium, where a content is bound to the network by encrypting content key information, which includes a content key required to decrypt the content, by using the network key, wherein said content importing apparatus including:
an obtaining unit operable to obtain a content and encrypted content key information, which includes the content key for the content, from outside said content importing apparatus;

an identification information generating unit operable to generate identification information for identifying the content obtained by said obtaining unit; and an encryption converting unit operable to convert encryption by decrypting the encrypted content key information obtained by said obtaining unit, adding the identification information to the decrypted content key information, and re-encrypting the content key information by using the network key;

wherein each content using apparatus includes:
a first decrypting unit operable to decrypt the re-encrypted content key information by using the network key; and a second decrypting unit operable to decrypt the content by using the content key included in the decrypted content key information; and wherein said content writing apparatus including:
a writing unit operable to write a content onto a storage medium;

a table storing unit operable to store a table for recording identification information of the content written on the storage medium by said writing unit; and a table managing unit operable to judge whether or not writing of a content is permitted by using the table and to control said writing unit in accordance with a judgment result.

28. A content using system according to claim 22, wherein:
said first decrypting unit is operable to generate an ID by uniformly incrementing or uniformly decrementing a value in desired units and to transmit the generated ID to the second decrypting unit;

said second decrypting unit is operable to record the received ID and transmit the ID to said first decrypting unit when a write process is to be resumed; and said first decrypting unit is operable to compare the received ID with a most recently generated ID and permit a resumption of the write process only when a difference between the IDs is a certain value or below.

29. A content using system in which a content importing apparatus and at least one content using apparatus are connected to a network, wherein said content importing apparatus includes:
an encryption converting unit operable to convert encryption by decrypting encrypted content key information, generating secret information for influencing a content key, and re-encrypting the content key information by using an encryption key that is shared in advance on the network and the secret information; and an output request processing unit operable to receive a content output request from a content using apparatus and to transmit a request response including at least the secret information; and wherein said content using apparatus includes:
an output requesting unit operable to transmit an output request, which includes at least an output destination of a content, to said content importing apparatus, to receive the request response, and to obtain the secret information;

a first decrypting unit operable to decrypt the re-encrypted content key information by using an encryption key shared in advance on the network and the secret information;

a control unit operable to output content output control information for controlling a selecting unit;

a second decrypting unit operable to decrypt the encrypted content by using the content key;

a selecting unit operable to select an output destination of the content based on the content output control information; and at least one output unit operable to output the content.

30. A content using apparatus that uses a content that has been bound to a network by encrypting content key information, which includes a content key required to decrypt the content, by using a network key, said content using apparatus comprising:

a first decrypting unit operable to decrypt the re-encrypted content key information by using the network key;

a second decrypting unit operable to decrypt the content by using the content key in the content key information decrypted by said first decrypting unit;

a writing unit operable to write the content decrypted by said second decrypting unit onto a storage medium;

a table storing unit operable to store a table in which the identification information included in the content key information decrypted by said first decrypting unit is associated with a number of times the content corresponding to the identification information has been written by said writing unit; and a suppressing unit operable to obtain the identification information of the content to be written by said writing unit, to refer, in the table, to the number of times the content corresponding to the identification information has been written, and to suppress writing of the content by said writing unit when the number of times has reached a predetermined maximum number of times.

31. A content importing apparatus that binds a content to a network to which a plurality of apparatuses that share a network key are connected by encrypting content key information, which includes a content key required to decrypt the content, by using the network key, said content importing apparatus including:
   an obtaining unit operable to obtain a content and encrypted content key information, which includes a content key for the content, from outside said content importing apparatus;
   an identification information generating unit operable to generate identification information for identifying the content obtained by said obtaining unit; and
   an encryption converting unit operable to convert encryption by decrypting the encrypted content key information obtained by said obtaining unit, adding the identification information to the decrypted content key information, and re-encrypting the content key information by using the network key,
   wherein the identification information is used to manage writing of the content, which has been bound to the network, onto a storage medium in an unbound state.

32. A content using method of using a content on a network to which a plurality of apparatuses are connected, said method comprising:
   a binding step which is performed in at least one of the plurality of apparatuses and in which a content is bound to the network by putting the content in a state where only apparatuses on the network can use the content;
   an identification information issuing step which is performed in at least one of the plurality of apparatuses and in which identification information that corresponds to the content that has been bound to the network in said binding step is issued;
   a judging step which is performed in at least one of the plurality of apparatuses and in which identification information of a content, which has been bound to the network and is to be written in an unbound state, is obtained, a table in which identification information of contents that have already been written is recorded is referred to in a memory, and a judgment of whether or not writing of the content is permitted is performed;
   a bind removing step which is performed in at least one of the plurality of apparatuses and in which the content that has been bound to the network by said binding unit is put in an unbound state when the judgment in said judging step is that writing is permitted; and
   a writing step which is performed in at least one of the plurality of apparatuses and in which the content put in the unbound state in said bind removing step is written onto a storage medium.

33. A content using method performed by an apparatus that uses a content that has been bound to a network by encrypting content key information, which includes a content key that is required to decrypt the content, by using a network key, said content using method comprising:
   a first decrypting step of decrypting the encrypted content key information by using the network key;
   a second decrypting step of decrypting the content by using the content key in the content key information decrypted in said first decrypting step;
   a judging step of obtaining identification information of a content, which has been bound to the network and is to be written in an unbound state, referring to a table, in which identification information of contents that have already been written is recorded, in a memory, and judging whether or not writing the content is permitted; and
   a writing step of putting the bound content into an unbound state and writing the content in the unbound state onto a storage medium when said judging step has judged that writing is permitted.

34. A content using program for a content using system that includes a content importing apparatus and at least one content using apparatus that share a network key, where a content is bound to the network by encrypting content key information, which includes a content key required to decrypt the content, by using a network key, said content using program including a first program that is executed by the content importing apparatus and a second program that is executed by a content using apparatus,
   wherein said first program causes a computer to function as:
      an obtaining unit operable to obtain a content and encrypted content key information, which includes a content key for the content, from outside the content importing apparatus;
      an identification information generating unit operable to generate identification information for identifying the content obtained by said obtaining unit; and
      an encryption converting unit operable to convert encryption by decrypting the encrypted content key information obtained by said obtaining unit, adding the identification information to the decrypted content key information, and re-encrypting the content key information by using the network key; and
   wherein said second program causes a computer to function as:
      a first decrypting unit operable to decrypt the re-encrypted content key information by using the network key;
      a second decrypting unit operable to decrypt the content by using the content key in the content key information decrypted by said first decrypting unit;
      a writing unit operable to write the content decrypted by said second decrypting unit on a storage medium;
      a table storing unit operable to store a table in which the identification information included in the content key information decrypted by said first decrypting unit is associated with a number of times the content corresponding to the identification information has been written by said writing unit; and
      a suppressing unit operable to obtain the identification information of the content to be written by said writing unit, to refer, in the table, to the number of times the content corresponding to the identification information has been written, and to suppress writing by said writing unit when the number of times has reached a predetermined maximum number of times.

35. A content using program executed by an apparatus that uses a content that has been bound to a network by encrypting content key information, which includes a content key that is required to decrypt the content, by using a network key, said program causing a computer to function as:
   a first decrypting unit operable to decrypt the encrypted content key information by using the network key;
   a second decrypting unit operable to decrypt the content by using the content key in the content key information decrypted by said first decrypting unit;
   a writing unit operable to write the content decrypted by said second decrypting unit onto a storage medium;
   a table storing unit operable to store a table in which the identification information included in the content key information decrypted by said first decrypting unit is associated with a number of times the content corresponding to the identification information has been written by said writing unit; and a suppressing unit operable to obtain the identification information of the content to be written by said writing unit, to refer, in the table, to the number of times the content corresponding to the identification information has been written, and to suppress writing by said writing unit when the number of times has reached a predetermined maximum number of times.

* * * * *